(12) United States Patent
Cirriez et al.

(10) Patent No.: US 11,274,171 B2
(45) Date of Patent: Mar. 15, 2022

(54) DUAL CATALYST COMPOSITION

(71) Applicant: TOTAL RESEARCH & TECHNOLOGY FELUY, Seneffe (BE)

(72) Inventors: Virginie Cirriez, Waterloo (BE); Alexandre Welle, Court-St-Etienne (BE); Aurélien Vantomme, Mignault (BE)

(73) Assignee: Total Research & Technology Feluy, Seneffe (BE)

( * ) Notice: Subject to any disclaimer, the term of this patent is extended or adjusted under 35 U.S.C. 154(b) by 76 days.

(21) Appl. No.: 16/633,675

(22) PCT Filed: Aug. 2, 2018

(86) PCT No.: PCT/EP2018/070971
§ 371 (c)(1),
(2) Date: Jan. 24, 2020

(87) PCT Pub. No.: WO2019/025528
PCT Pub. Date: Feb. 7, 2019

(65) Prior Publication Data
US 2021/0155724 A1   May 27, 2021

(30) Foreign Application Priority Data

Aug. 2, 2017   (EP) ..................... 17184406

(51) Int. Cl.
*C08F 4/76* (2006.01)
*C08F 4/64* (2006.01)
*C08F 210/16* (2006.01)
*C07F 17/00* (2006.01)
*B01J 35/00* (2006.01)
*C08F 4/642* (2006.01)
*C08F 4/659* (2006.01)
*C08F 4/6592* (2006.01)

(52) U.S. Cl.
CPC ......... *C08F 210/16* (2013.01); *B01J 35/0046* (2013.01); *C07F 17/00* (2013.01); *C08F 4/6428* (2013.01); *C08F 4/65912* (2013.01); *C08F 4/65916* (2013.01); *C08F 4/65927* (2013.01)

(58) Field of Classification Search
CPC . C08F 4/65927; C08F 4/65912; C08F 210/16
See application file for complete search history.

(56) References Cited

U.S. PATENT DOCUMENTS

| | | | |
|---|---|---|---|
| 6,376,418 B1 | 4/2002 | Shamshoum et al. | |
| 7,226,886 B2* | 6/2007 | Jayaratne | C08F 10/00 502/129 |
| 7,521,572 B2* | 4/2009 | Jayaratne | B01J 31/143 556/53 |
| 7,632,907 B2* | 12/2009 | Sukhadia | C08J 5/18 526/348.1 |
| 7,960,487 B2* | 6/2011 | Yang | C08F 10/00 526/113 |
| 8,278,403 B2* | 10/2012 | Coffy | C08F 10/06 526/113 |
| 8,329,834 B2* | 12/2012 | Masino | C08F 4/65916 526/114 |
| 8,609,793 B2* | 12/2013 | Buck | C08F 4/642 526/113 |
| 11,014,997 B2* | 5/2021 | Ding | C08L 23/0807 |
| 2012/0010375 A1 | 1/2012 | Yang et al. | |

FOREIGN PATENT DOCUMENTS

| | | |
|---|---|---|
| WO | 2008113680 A1 | 9/2008 |
| WO | 2013151863 A1 | 10/2013 |
| WO | 2015004193 A1 | 1/2015 |
| WO | 2015082709 A1 | 6/2015 |

OTHER PUBLICATIONS

International Search Report issued in Application No. PCT/EP2018/070971, dated Oct. 19, 2018, 4 pages.
G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, n° 4, 1977, p. 773-778.
Y.D Zhang et al., "13C NMR, GPC, and DCS Study on a Propylene-ethylene-1-butene Terpolymer Fractionated by Termperature Rising Elution Fractionation" Polymer Journal, vol. 35, n°7, 2003, p. 551-559.
Bernd Peifer et al., "Selbstimmobilisierende Metallocenkatalysatoren"; Journal of Organometallic Chemistry, (1998), vol. 553, pp. 205-220.
Camille Descour et al., "Synthesis and characterization of iPP-sPP stereoblock produced by a binary metallocene system", Journal of Polymer Science, Part A: Polymer Chemistry, (Mar. 13, 2014), vol. 52, No. 10, pp. 1422-1434.

* cited by examiner

*Primary Examiner* — Rip A Lee
(74) *Attorney, Agent, or Firm* — Albert Shung

(57) ABSTRACT

The present invention relates to a catalyst composition comprising:
  catalyst component A comprising a bridged metallocene compound with two indenyl groups, each indenyl being substituted with one or more substituents, wherein at least one of the substituent is an aryl or heteroaryl;
  catalyst component B comprising a bridged metallocene compound with a substituted or unsubstituted cyclopentadienyl group and a substituted or unsubstituted fluorenyl group;
  an optional activator; an optional support; and an optional co-catalyst.

The present invention also relates to a polymerization process using said composition. The invention further relates to olefin polymers at least partially catalyzed by said catalyst composition and articles comprising said olefin polymers.

14 Claims, 4 Drawing Sheets

DUAL CATALYST COMPOSITION

CROSS-REFERENCE TO RELATED APPLICATIONS

This application claims the benefit of PCT/EP2018/070971 filed Aug. 2, 2018, which claims priority from EP 17184406.1 filed Aug. 2, 2017, which are incorporated herein by reference in their entireties for all purposes.

FIELD OF INVENTION

The invention relates to the new dual catalyst, in particular dual site catalysts for polymerization reactions.

BACKGROUND OF THE INVENTION

In the field of polymer, constant mechanical properties improvement is mandatory. It was achieved in the last few years using metallocene catalyst combined with cascade reactor to make tailor made bimodal resins. However, the requirement of multiple reactors leads to increased costs for both construction and operation, and this can be overcome using dual-site catalysts in a single reactor.

In the prior art, the first obvious strategy was multiple separate catalyst injection. Although, this process showed high flexibility, several drawbacks can be highlighted: multiple catalysts injections lead to increased costs and polymer homogeneity was difficult to achieve.

The strategy of using a dual-site catalyst in a single reactor seemed therefore to be a good alternative. However, this technology suffers from the difficulty to control properly the heterogenization and more importantly the activation. This might be related to the different behavior of metallocene during the heterogenization process typically leading to a dominating structure while others seem inactive. Moreover, in several examples in the literature, some combinations suffer of a lack of reactivity or works only in specific conditions or in a specific process. The challenge is to find the right combination of metallocenes to avoid these drawbacks.

SUMMARY OF THE INVENTION

It is therefore an object of the present invention to provide a new dual catalyst avoiding the above mentioned drawbacks.

In a first aspect, the present invention provides a catalyst composition comprising:
catalyst component A comprising a bridged metallocene compound with two groups independently selected from indenyl or tetrahydroindenyl, each group being unsubstituted or substituted;
catalyst component B comprising a bridged metallocene compound with a substituted or unsubstituted cyclopentadienyl group and a substituted or unsubstituted fluorenyl group;
an optional activator; an optional support; and an optional co-catalyst.

In a preferred first aspect, the present invention provides a catalyst composition comprising: catalyst component A comprising a bridged metallocene compound with two indenyl groups each indenyl being independently substituted with one or more substituents, wherein at least one of the substituent is an aryl or heteroaryl; preferably wherein the aryl or heteroaryl substituent is on the 3-position on each indenyl;
catalyst component B comprising a bridged metallocene compound with a substituted or unsubstituted cyclopentadienyl group and a substituted or unsubstituted fluorenyl group;
an optional activator; an optional support; and an optional co-catalyst.

In a second aspect, the present invention provides an olefin polymerization process, the process comprising: contacting at least one catalyst composition according to the first aspect, or preferred first aspect, with an olefin monomer, optionally hydrogen, and optionally one or more olefin co-monomers; and polymerizing the monomer, and the optionally one or more olefin co-monomers, in the presence of the at least one catalyst composition, and optional hydrogen, thereby obtaining a polyolefin.

In a third aspect, the present invention provides, an olefin polymer at least partially catalyzed by at least one catalyst composition according to the first aspect, or preferred first aspect, or produced by the process according to the second aspect of the invention.

The present invention also encompasses an article comprising the olefin polymer according to the third aspect.

The invention provides a composition comprising a dual catalyst which means a catalyst particle with two metallocene active sites on a single carrier. For example, catalyst "A" can produce short chains without co-monomer while catalyst "B" can produce longer chains with high concentration of co-monomer. The catalyst composition can be used in single reactor processes (slurry loop and/or gas phase) or even in multimodal processes.

The invention overcomes the drawbacks of the aforementioned strategies. Such catalyst compositions can be used to produce, for example, ethylene-copolymers having broad molecular weight distributions, ideal co-monomer incorporation to improve mechanical properties and a higher activity compare to other systems. After the polymer is produced, it may be formed into various articles, including but not limited to, film products, caps and closures, rotomoulding, grass yarn, etc.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other features or statements indicated as being preferred or advantageous.

DETAILED DESCRIPTION OF THE INVENTION

Figure 1:
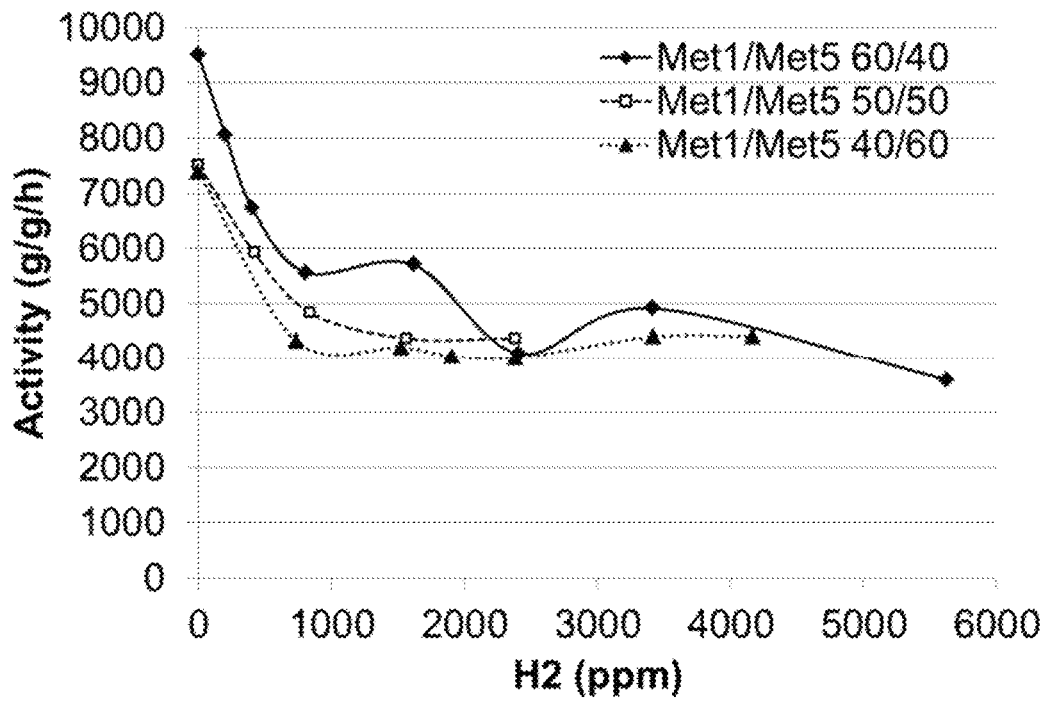
FIG. 1 represents a graph plotting the activity of different catalyst compositions Met1/Met5 as a function of hydrogen concentration.

Before the present compounds, processes, articles, and uses encompassed by the invention are described, it is to be understood that this invention is not limited to particular compounds, processes, articles, and uses described, as such compounds, processes, articles, and uses may, of course, vary. It is also to be understood that the terminology used herein is not intended to be limiting, since the scope of the present invention will be limited only by the appended claims.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. When describing the compounds, processes, articles, and uses of the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Whenever the term "substituted" is used herein, it is meant to indicate that one or more hydrogen atoms on the atom indicated in the expression using "substituted" is replaced with a selection from the indicated group, provided that the indicated atom's normal valence is not exceeded, and that the substitution results in a chemically stable compound, i.e. a compound that is sufficiently robust to survive isolation from a reaction mixture. Preferred substituents for the indenyl, tetrahydroindenyl, cyclopentadienyl and fluorenyl groups, can be selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl. Preferably, each indenyl is substituted with at least one aryl or heteroaryl, more preferably aryl; preferably wherein the aryl or heteroaryl substituent is on the 3-position on each indenyl; the indenyl can be further substituted with one or more substituents selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl.

The term "halo" or "halogen" as a group or part of a group is generic for fluoro, chloro, bromo, iodo.

The term "alkyl" as a group or part of a group, refers to a hydrocarbyl group of formula $C_nH_{2n+1}$ wherein n is a number greater than or equal to 1. Alkyl groups may be linear or branched and may be substituted as indicated herein. Generally, alkyl groups of this invention comprise from 1 to 20 carbon atoms, preferably from 1 to 10 carbon atoms, preferably from 1 to 6 carbon atoms, more preferably from 1 to 4 carbon atoms. When a subscript is used herein following a carbon atom, the subscript refers to the number of carbon atoms that the named group may contain. For example, the term "$C_{1-20}$alkyl", as a group or part of a group, refers to a hydrocarbyl group of formula —$C_nH_{2n+1}$ wherein n is a number ranging from 1 to 20. Thus, for example, "$C_{1-8}$alkyl" includes all linear or branched alkyl groups with between 1 and 8 carbon atoms, and thus includes methyl, ethyl, n-propyl, i-propyl, butyl and its isomers (e.g. n-butyl, i-butyl and t-butyl); pentyl and its isomers, hexyl and its isomers, etc. A "substituted alkyl" refers to an alkyl group substituted with one or more substituent(s) (for example 1 to 3 substituent(s), for example 1, 2, or 3 substituent(s)) at any available point of attachment.

When the suffix "ene" is used in conjunction with an alkyl group, i.e. "alkylene", this is intended to mean the alkyl group as defined herein having two single bonds as points of attachment to other groups. As used herein, the term "alkylene" also referred as "alkanediyl", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH(CH_3)$—$CH_2$—), 3-methylpropylene (—$CH_2$—$CH_2$—$CH(CH_3)$—), n-butylene (—$CH_2$—$CH_2$—$CH_2$—$CH_2$—), 2-methylbutylene (—CH$_2$—CH(CH$_3$)—CH$_2$—CH$_2$—), 4-methylbutylene (—CH$_2$—CH$_2$—CH$_2$—CH(CH$_3$)—), pentylene and its chain isomers, hexylene and its chain isomers.

The term "alkenyl" as a group or part of a group, refers to an unsaturated hydrocarbyl group, which may be linear, or branched, comprising one or more carbon-carbon double bonds. Generally, alkenyl groups of this invention comprise from 3 to 20 carbon atoms, preferably from 3 to 10 carbon atoms, preferably from 3 to 8 carbon atoms. When a subscript is used herein following a carbon atom, the subscript refers to the number of carbon atoms that the named group may contain. Examples of C$_{3-20}$alkenyl groups are ethenyl, 2-propenyl, 2-butenyl, 3-butenyl, 2-pentenyl and its isomers, 2-hexenyl and its isomers, 2,4-pentadienyl, and the like.

The term "alkoxy" or "alkyloxy", as a group or part of a group, refers to a group having the formula —OR$^b$ wherein R$^b$ is alkyl as defined herein above. Non-limiting examples of suitable alkoxy include methoxy, ethoxy, propoxy, isopropoxy, butoxy, isobutoxy, sec-butoxy, tert-butoxy, pentyloxy and hexyloxy.

The term "cycloalkyl", as a group or part of a group, refers to a cyclic alkyl group, that is a monovalent, saturated, hydrocarbyl group having 1 or more cyclic structure, and comprising from 3 to 20 carbon atoms, more preferably from 3 to 10 carbon atoms, more preferably from 3 to 8 carbon atoms; more preferably from 3 to 6 carbon atoms. Cycloalkyl includes all saturated hydrocarbon groups containing 1 or more rings, including monocyclic, bicyclic groups or tricyclic. The further rings of multi-ring cycloalkyls may be either fused, bridged and/or joined through one or more spiro atoms. When a subscript is used herein following a carbon atom, the subscript refers to the number of carbon atoms that the named group may contain. For example, the term "C$_{3-20}$cycloalkyl", a cyclic alkyl group comprising from 3 to 20 carbon atoms. For example, the term "C$_{3-10}$cycloalkyl", a cyclic alkyl group comprising from 3 to 10 carbon atoms. For example, the term "C$_{3-8}$cycloalkyl", a cyclic alkyl group comprising from 3 to 8 carbon atoms. For example, the term "C$_{3-6}$cycloalkyl", a cyclic alkyl group comprising from 3 to 6 carbon atoms. Examples of C$_{3-12}$cycloalkyl groups include but are not limited to adamantyl, cyclopropyl, cyclobutyl, cyclopentyl, cyclohexyl, cycloheptyl, cyclooctyl, bicycle[2.2.1]heptan-2yl, (1S,4R)-norbornan-2-yl, (1R,4R)-norbornan-2-yl, (1S,4S)-norbornan-2-yl, (1R,4S)-norbornan-2-yl.

When the suffix "ene" is used in conjunction with a cycloalkyl group, i.e. cycloalkylene, this is intended to mean the cycloalkyl group as defined herein having two single bonds as points of attachment to other groups. Non-limiting examples of "cycloalkylene" include 1,2-cyclopropylene, 1,1-cyclopropylene, 1,1-cyclobutylene, 1,2-cyclobutylene, 1,3-cyclopentylene, 1,1-cyclopentylene, and 1,4-cyclohexylene.

Where an alkylene or cycloalkylene group is present, connectivity to the molecular structure of which it forms part may be through a common carbon atom or different carbon atom. To illustrate this applying the asterisk nomenclature of this invention, a C$_3$alkylene group may be for example *—CH$_2$CH$_2$CH$_2$—*, *—CH(—CH$_2$CH$_3$)—* or *—CH$_2$CH(—CH$_3$)—*. Likewise a C$_3$cycloalkylene group may be

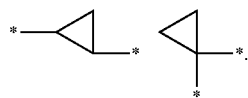

The term "cycloalkenyl" as a group or part of a group, refers to a non-aromatic cyclic alkenyl group, with at least one site (usually 1 to 3, preferably 1) of unsaturation, namely a carbon-carbon, sp2 double bond; preferably having from 5 to 20 carbon atoms more preferably from 5 to 10 carbon atoms, more preferably from 5 to 8 carbon atoms, more preferably from 5 to 6 carbon atoms. Cycloalkenyl includes all unsaturated hydrocarbon groups containing 1 or more rings, including monocyclic, bicyclic or tricyclic groups. The further rings may be either fused, bridged and/or joined through one or more spiro atoms. When a subscript is used herein following a carbon atom, the subscript refers to the number of carbon atoms that the named group may contain. For example, the term "C$_{5-20}$cycloalkenyl", a cyclic alkenyl group comprising from 5 to 20 carbon atoms. For example, the term "C$_{5-10}$cycloalkenyl", a cyclic alkenyl group comprising from 5 to 10 carbon atoms. For example, the term "C$_{5-8}$cycloalkenyl", a cyclic alkenyl group comprising from 5 to 8 carbon atoms. For example, the term "C$_{5-6}$cycloalkyl", a cyclic alkenyl group comprising from 5 to 6 carbon atoms. Examples include, but are not limited to: cyclopentenyl (—C$_5$H$_7$), cyclopentenylpropylene, methylcyclohexenylene and cyclohexenyl (—C$_6$H$_9$). The double bond may be in the cis or trans configuration.

The term "cycloalkenylalkyl", as a group or part of a group, means an alkyl as defined herein, wherein at least one hydrogen atom is replaced by at least one cycloalkenyl as defined herein.

The term "cycloalkoxy", as a group or part of a group, refers to a group having the formula —OR$^h$ wherein R$^h$ is cycloalkyl as defined herein above.

The term "aryl", as a group or part of a group, refers to a polyunsaturated, aromatic hydrocarbyl group having a single ring (i.e. phenyl) or multiple aromatic rings fused together (e.g. naphthyl), or linked covalently, typically containing 6 to 20 atoms; preferably 6 to 10, wherein at least one ring is aromatic. The aromatic ring may optionally include one to two additional rings (either cycloalkyl, heterocyclyl or heteroaryl) fused thereto. Examples of suitable aryl include C$_{6-20}$aryl, preferably C$_{6-10}$aryl, more preferably C$_{6-8}$aryl. Non-limiting examples of aryl comprise phenyl, biphenylyl, biphenylenyl, or 1- or 2-naphthanelyl; 1-, 2-, 3-, 4-, 5- or 6-tetralinyl (also known as "1,2,3,4-tetrahydronaphtalene); 1-, 2-, 3-, 4-, 5-, 6-, 7- or 8-azulenyl, 4-, 5-, 6 or 7-indenyl; 4- or 5-indanyl; 5-, 6-, 7- or 8-tetrahydronaphthyl; 1,2,3,4-tetrahydronaphthyl; and 1,4-dihydronaphthyl; 1-, 2-, 3-, 4- or 5-pyrenyl. A "substituted aryl" refers to an aryl group having one or more substituent(s) (for example 1, 2 or 3 substituent(s), or 1 to 2 substituent(s)), at any available point of attachment.

The term "aryloxy", as a group or part of a group, refers to a group having the formula —OR$^g$ wherein R$^g$ is aryl as defined herein above.

The term "arylalkyl", as a group or part of a group, means an alkyl as defined herein, wherein at least one hydrogen atom is replaced by at least one aryl as defined herein. Non-limiting examples of arylalkyl group include benzyl, phenethyl, dibenzylmethyl, methylphenylmethyl, 3-(2-naphthyl)-butyl, and the like.

The term "alkylaryl" as a group or part of a group, means an aryl as defined herein wherein at least one hydrogen atom is replaced by at least one alkyl as defined herein. Non-limiting example of alkylaryl group include p-CH$_3$—R$^g$—, wherein R$^g$ is aryl as defined herein above.

The term "arylalkyloxy" or "aralkoxy" as a group or part of a group, refers to a group having the formula —O—R$^a$—R$^g$ wherein R$^g$ is aryl, and R$^a$ is alkylene as defined herein above.

The term "heteroalkyl" as a group or part of a group, refers to an acyclic alkyl wherein one or more carbon atoms are replaced by at least one heteroatom selected from the group comprising O, Si, S, B, and P, with the proviso that said chain may not contain two adjacent heteroatoms. This means that one or more —CH$_3$ of said acyclic alkyl can be replaced by —OH for example and/or that one or more —CR$_2$— of said acyclic alkyl can be replaced by O, Si, S, B, and P.

The term "aminoalkyl" as a group or part of a group, refers to the group —R$^j$—NR$^k$R$^l$ wherein R$^j$ is alkylene, R$^k$ is hydrogen or alkyl as defined herein, and R$^l$ is hydrogen or alkyl as defined herein.

The term "heterocyclyl" as a group or part of a group, refers to non-aromatic, fully saturated or partially unsaturated cyclic groups (for example, 3 to 7 member monocyclic, 7 to 11 member bicyclic, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from N, S, Si, Ge, where the nitrogen and sulfur heteroatoms may optionally be oxidized and the nitrogen heteroatoms may optionally be quaternized. The heterocyclic group may be attached at any heteroatom or carbon atom of the ring or ring system, where valence allows. The rings of multi-ring heterocycles may be fused, bridged and/or joined through one or more spiro atoms.

Non limiting exemplary heterocyclic groups include aziridinyl, oxiranyl, thiiranyl, piperidinyl, azetidinyl, 2-imidazolinyl, pyrazolidinyl imidazolidinyl, isoxazolinyl, oxazolidinyl, isoxazolidinyl, thiazolidinyl, isothiazolidinyl, piperidinyl, succinimidyl, 3H-indolyl, indolinyl, isoindolinyl, 2H-pyrrolyl, 1-pyrrolinyl, 2-pyrrolinyl, 3-pyrrolinyl, pyrrolidinyl, 4H-quinolizinyl, 2-oxopiperazinyl, piperazinyl, homopiperazinyl, 2-pyrazolinyl, 3-pyrazolinyl, tetrahydro-2H-pyranyl, 2H-pyranyl, 4H-pyranyl, 3,4-dihydro-2H-pyranyl, oxetanyl, thietanyl, 3-dioxolanyl, 1,4-dioxanyl, 2,5-dioximidazolidinyl, 2-oxopiperidinyl, 2-oxopyrrolodinyl, indolinyl, tetrahydropyranyl, tetrahydrofuranyl, tetrahydrothiophenyl, tetrahydroquinolinyl, tetrahydroisoquinolin-1-yl, tetrahydroisoquinolin-2-yl, tetrahydroisoquinolin-3-yl, tetrahydroisoquinolin-4-yl, thiomorpholin-4-yl, thiomorpholin-4-ylsulfoxide, thiomorpholin-4-ylsulfone, 1,3-dioxolanyl, 1,4-oxathianyl, 1,4-dithianyl, 1,3,5-trioxanyl, 1H-pyrrolizinyl, tetrahydro-1,1-dioxothiophenyl, N-formylpiperazinyl, and morpholin-4-yl.

Whenever used in the present invention the term "compounds" or a similar term is meant to include the compounds of general formula (I) and/or (II) and any subgroup thereof, including all polymorphs and crystal habits thereof, and isomers thereof (including optical, geometric and tautomeric isomers) as hereinafter defined.

The compounds of formula (I) and/or (II) or any subgroups thereof may comprise alkenyl group, and the geometric cis/trans (or Z/E) isomers are encompassed herein. Where structural isomers are interconvertible via a low energy barrier, tautomeric isomerism ('tautomerism') can occur. This can take the form of proton tautomerism in compounds of formula (I) containing, for example, a keto group, or so-called valence tautomerism in compounds which contain an aromatic moiety. It follows that a single compound may exhibit more than one type of isomerism.

Cis/trans isomers may be separated by conventional techniques well known to those skilled in the art, for example, chromatography and fractional crystallization.

Preferred statements (features) and embodiments of the compositions, processes, polymers, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered statements and embodiments, with any other aspect and/or embodiment.

1. A catalyst composition comprising:
   catalyst component A comprising a bridged metallocene compound with two groups independently selected from indenyl or tetrahydroindenyl, each group being unsubstituted or substituted;
   catalyst component B comprising a bridged metallocene compound with a substituted or unsubstituted cyclopentadienyl group and a substituted or unsubstituted fluorenyl group;
   an optional activator; an optional support; and an optional co-catalyst.

2. A catalyst composition comprising:
   catalyst component A comprising a bridged metallocene compound with two indenyl groups each indenyl being independently substituted with one or more substituents, wherein at least one of the substituent is an aryl or heteroaryl, preferably aryl; preferably wherein the aryl or heteroaryl substituent is on the 3-position on each indenyl;
   catalyst component B comprising a bridged metallocene compound with a substituted or unsubstituted cyclopentadienyl group and a substituted or unsubstituted fluorenyl group;
   an optional activator; an optional support; and an optional co-catalyst.

3. A catalyst composition comprising:
   catalyst component A comprising a bridged metallocene compound with two indenyl groups each indenyl being independently substituted with one or more substituents, wherein at least one of the substituent is an aryl or heteroaryl, preferably aryl; preferably wherein the aryl or heteroaryl substituent is on the 3-position on each indenyl;
   catalyst component B comprising a bridged metallocene compound with a substituted or unsubstituted cyclopentadienyl group and a substituted or unsubstituted fluorenyl group;
   an activator; a support; and an optional co-catalyst.

4. The composition according to any one of statements 1-3, wherein the bridged metallocene compound of catalyst component B comprises at least one alkenyl, cycloalkenyl, or cycloalkenylalkyl substituent, preferably at least one $C_{3-20}$alkenyl, $C_{5-20}$cycloalkenyl, or $C_{6-20}$cycloalkenylalkyl substituent, more preferably at least one $C_{3-8}$alkenyl, $C_{5-8}$cycloalkenyl, or $C_{6-8}$cycloalkenylalkyl substituent.

5. The composition according to any one of statements 1-4, wherein the bridged metallocene compound of catalyst component B comprises at least one alkenyl, cycloalkenyl, or cycloalkenylalkyl substituent on the bridge; preferably at least one $C_{3-20}$alkenyl, $C_{5-20}$cycloalkenyl, or $C_{6-20}$cycloalkenylalkyl substituent, more preferably at least one $C_{3-8}$alkenyl, $C_{5-8}$cycloalkenyl, or $C_{6-8}$cycloalkenylalkyl substituent.

6. The composition according to any one of statements 1-5, wherein catalyst component B contains a C, Si, B or Ge bridging atom.

7. The composition according to any one of statements 1-6, wherein the activator comprises an aluminoxane compound, an organoboron or organoborate compound, an ionizing ionic compound, or any combination thereof, preferably wherein the activator comprises an alumoxane compound.

8. The composition according to any one of statements 1-7, wherein the activator comprises at least one alumoxane compound of formula (V) or (VI)

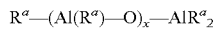  (V) for oligomeric, linear alumoxanes; or

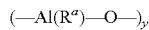  (VI) for oligomeric, cyclic alumoxanes wherein x is 1-40, and preferably 10-20;
wherein y is 3-40, and preferably 3-20; and
wherein each $R^a$ is independently selected from a $C_{1-8}$alkyl, and preferably is methyl.

9. The composition according to any one of statements 1-8, wherein the activator is methyl alumoxane.

10. The composition according to any one of statements 1-9, wherein the catalyst composition comprises a co-catalyst.

11. The composition according to any one of statements 1-10, wherein the catalyst composition comprises an organoaluminum co-catalyst.

12. The composition according to any one of statements 1-11, wherein the catalyst composition comprises an organoaluminum co-catalyst selected from the group comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and any combination thereof.

13. The composition according to any one of statements 1-12, wherein the support comprises a solid oxide, preferably a solid inorganic oxide, preferably, the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof.

14. The composition according to any one of statements 1-13, wherein the support has a D50 of at most 50 μm, preferably of at most 40 μm, preferably of at most 30 μm. The D50 is defined as the particle size for which fifty percent by weight of the particles has a size lower than the D50. The particle size may be measured by laser diffraction analysis on a Malvern type analyzer.

15. The composition according to any one of statements 1-14, comprising an alumoxane activator; and a titanated silica or silica solid support; and an optional co-catalyst.

16. The composition according to any one of statements 1-15, wherein the weight ratio of catalyst component A to catalyst component B is in a range of from 1:9 to about 9:1, preferably the weight ratio of catalyst component A to catalyst component B is in a range of from 1:5 to about 5:1, preferably 1:4 to 4:1.

17. The composition according to any one of statements 1-16, wherein catalyst component A comprises a bridged metallocene catalyst of formula (I), wherein

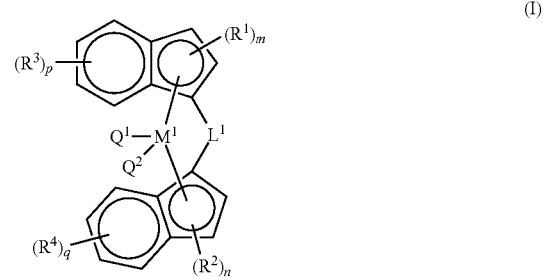

each of $R^1$, and $R^3$, are independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, heteroalkyl; wherein at least one of $R^1$ or $R^3$ is aryl, wherein each $R^{10}$ is independently hydrogen, alkyl, or alkenyl; and m, n, p, q are each independently an integer selected from 0, 1, 2, 3, or 4;

each of $R^2$, and $R^4$, are independently selected from the group consisting of alkyl, alkenyl, cycloalkyl, cycloalkenyl, cycloalkenylalkyl, phenyl, alkoxy, alkylaryl, arylalkyl, halogen, $Si(R^{10})_3$, heteroalkyl; wherein at least one of $R^2$ or $R^4$ is aryl, wherein each $R^{10}$ is independently hydrogen, alkyl, or alkenyl; and m, n, p, q are each independently an integer selected from 0, 1, 2, 3, or 4;

$L^1$ is —$[CR^8R^9]_n$—, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl;

$M^1$ is a transition metal selected from the group consisting of zirconium, titanium, hafnium, and vanadium; and preferably is zirconium; and $Q^1$ and $Q^2$ are each independently selected from the group consisting of halogen, alkyl, —$N(R^{11})_2$, alkoxy, cycloalkoxy, aralkoxy, cycloalkyl, aryl, alkylaryl, aralkyl, and heteroalkyl; wherein $R^{11}$ is hydrogen or alkyl.

18. The composition according to any one of statements 1-17, wherein the catalyst component A contains a $SiR^8R^9$, or —$[CR^8R^9]_h$— bridging group; preferably a $SiR^8R^9$ bridging group; wherein h is an integer selected from 1, 2, or 3; each of $R^8$, and $R^9$ are independently selected from the group comprising hydrogen, alkyl, alkenyl, cycloalkyl, cycloalkenyl, cycloalkenylalkyl, aryl, aminoalkyl, and arylalkyl, preferably alkyl; or $R^8$ and $R^9$ together with the atom to which they are attached form a cycloalkyl, cycloalkenyl or heterocyclyl.

19. The composition to any one of statements 1-18, wherein catalyst component B comprises a bridged metallocene catalyst of formula (II), wherein

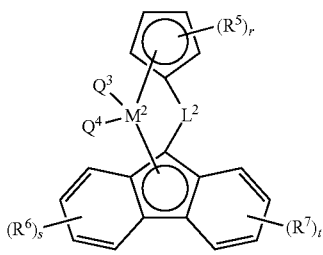

(II)

each of R⁵, R⁶, and R⁷, are independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, and heteroalkyl; wherein each $R^{10}$ is independently hydrogen, alkyl, or alkenyl; and r, s, t are each independently an integer selected from 0, 1, 2, 3, or 4;

$L^2$ is —$[CR^8R^9]_h$—, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl;

$M^2$ is a transition metal selected from the group consisting of zirconium, titanium, hafnium, and vanadium; and preferably is zirconium; and $Q^3$ and $Q^4$ are each independently selected from the group consisting of halogen, alkyl, —$N(R^{11})_2$, alkoxy, cycloalkoxy, aralkoxy, cycloalkyl, aryl, alkylaryl, aralkyl, and heteroalkyl; wherein $R^{11}$ is hydrogen or alkyl.

20. The composition according to any one of statements 1-19, wherein catalyst component A comprises a bridged metallocene catalyst of formula (I), wherein

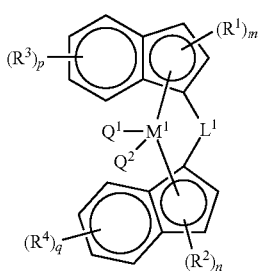

(I)

each dotted line represents an optional double bond each of $R^1$, $R^3$ are independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-12}$alkyl; wherein at least one of $R^1$ or $R^3$ is $C_{6-20}$aryl, preferably phenyl; wherein each $R^{10}$ is independently hydrogen, $C_{1-20}$alkyl, or $C_{3-20}$alkenyl; and m, n, p, q are each independently an integer selected from 0, 1, 2, 3, or 4;

each of $R^2$, $R^4$ are independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^1)_3$, and heteroC$_{1-12}$alkyl; wherein at least one of $R^2$ or $R^4$ is $C_{6-20}$aryl, preferably phenyl; wherein each $R^{10}$ is independently hydrogen, $C_{1-20}$alkyl, or $C_{3-20}$alkenyl; and m, n, p, q are each independently an integer selected from 0, 1, 2, 3, or 4;

$L^1$ is —$[CR^8R^9]_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-12}$aryl, aminoC$_{1-6}$alkyl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl; preferably $L^1$ is $SiR^8R^9$; each of $R^8$, and $R^9$ are independently selected from the group consisting of hydrogen, $C_{1-20}$alkyl, $C_{3-20}$alkenyl, $C_{3-20}$ cycloalkyl, $C_{5-20}$cycloalkenyl, $C_{6-20}$cycloalkenylalkyl, $C_{6-12}$aryl, aminoC$_{1-6}$alkyl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl; preferably each of $R^8$, and $R^9$ are independently selected from the group consisting of $C_{1-6}$alkyl;

$M^1$ is a transition metal selected from the group consisting of zirconium, titanium, hafnium, and vanadium; and preferably is zirconium; and $Q^1$ and $Q^2$ are each independently selected from the group consisting of halogen, $C_{1-20}$alkyl, —$N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl.

21. The composition according to any one of statements 1-20, wherein catalyst component B comprises a bridged metallocene catalyst of formula (II), wherein

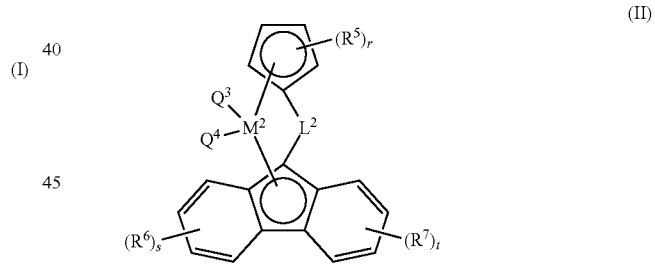

(II)

each of R⁵, R⁶, and R⁷, are independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-20}$alkyl; wherein each $R^{10}$ is independently hydrogen, $C_{1-20}$alkyl, or $C_{3-20}$alkenyl; and r, s, t are each independently an integer selected from 0, 1, 2, 3, or 4;

$L^2$ is —$[CR^8R^9]_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$alkyl, $C_{3-20}$alkenyl, $C_{3-20}$ cycloalkyl, $C_{5-20}$cycloalkenyl, $C_{5-20}$cycloalkenylalkyl, $C_{6-12}$aryl, aminoC$_{1-6}$alkyl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl;

M² is a transition metal selected from the group consisting of zirconium, titanium, hafnium, and vanadium; and preferably is zirconium; and Q³ and Q⁴ are each independently selected from the group consisting of halogen, $C_{1-20}$alkyl, $-N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl.

22. The composition according to any one of statements 17-21, wherein each of $R^1$, and $R^3$ are independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$ alkylaryl, $C_{7-12}$arylalkyl, halogen, $Si(R^{10})_3$, and heteroC$_{1-8}$alkyl; wherein at least one of $R^1$ or $R^3$ is $C_{6-12}$aryl, preferably phenyl; wherein each $R^{10}$ is independently hydrogen, $C_{1-8}$alkyl, or $C_{3-8}$alkenyl; and m, n, p, q are each independently an integer selected from 0, 1, 2, 3, or 4;

each of $R^2$, and $R^4$, are independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$ alkylaryl, $C_{7-12}$arylalkyl, halogen, $Si(R^{10})_3$, and heteroC$_{1-8}$alkyl; wherein at least one of $R^2$ or $R^2$ is $C_{6-12}$aryl, preferably phenyl; wherein each $R^{10}$ is independently hydrogen, $C_{1-8}$alkyl, or $C_{3-8}$alkenyl; and m, n, p, q are each independently an integer selected from 0, 1, 2, 3, or 4;

$L^1$ is $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, aminoC$_{1-6}$alkyl, and $C_7$-$C_{12}$arylalkyl; or $R^8$ and $R^9$ together with the atom to which they are attached form a $C_{3-8}$cycloalkyl, $C_{5-8}$cycloalkenyl or heterocyclyl; preferably $L^1$ is $SiR^8R^9$; preferably each of $R^8$, and $R^9$ are independently selected from the group consisting of hydrogen, or $C_{1-8}$alkyl;

M¹ is a transition metal selected from the group consisting of zirconium, titanium, hafnium, and vanadium; and preferably is zirconium; and Q¹ and Q² are each independently selected from the group consisting of halogen, $C_{1-8}$alkyl, $-N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and heteroC$_{1-8}$alkyl; wherein $R^{11}$ is hydrogen or $C_{1-8}$alkyl.

23. The composition according to any one of statements 17-22, wherein each of $R^5$, $R^6$, and $R^7$, are independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, $Si(R^{10})_3$, and heteroC$_{1-8}$alkyl; wherein each $R^{10}$ is independently hydrogen, $C_{1-8}$alkyl, or $C_{3-8}$alkenyl; and r, s, t are each independently an integer selected from 0, 1, 2, 3, or 4;

$L^2$ is $-[CR^8R^9]_h-$, $SiR^8R^9$, $GeR^8R^9$, or $BR^3$; wherein h is an integer selected from 1, 2, or 3; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, aminoC$_{1-6}$alkyl, and $C_7$-$C_{12}$arylalkyl; or $R^8$ and $R^9$ together with the atom to which they are attached form a $C_{3-8}$cycloalkyl, $C_{5-8}$cycloalkenyl or heterocyclyl;

M² is a transition metal selected from the group consisting of zirconium, titanium, hafnium, and vanadium; and preferably is zirconium; and Q³ and Q⁴ are each independently selected from the group consisting of halogen, $C_{1-8}$alkyl, $-N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and heteroC$_{1-8}$alkyl; wherein $R^{11}$ is hydrogen or $C_{1-8}$alkyl.

24. The composition according to any one of statements 17-23, wherein each of $R^1$, and $R^3$ are independently selected from the group consisting of $C_{1-8}$alkyl, $C_{3-8}$alkenyl, $C_{3-8}$cycloalkyl, $C_{6-12}$aryl, and halogen; wherein at least one of $R^1$ or $R^3$ is $C_{6-12}$aryl, preferably phenyl; and m, n, p, q are each independently an integer selected from 0, 1, 2, 3, or 4; preferably 0, 1, 2, or 3, preferably 0, 1, or 2; preferably 0, or 1;

each of $R^2$, and $R^4$, are independently selected from the group consisting of $C_{1-8}$alkyl, $C_{3-8}$alkenyl, $C_{3-8}$cycloalkyl, $C_{6-12}$aryl, and halogen; wherein at least one of $R^2$ or $R^2$ is $C_{6-12}$aryl, preferably phenyl; and m, n, p, q are each independently an integer selected from 0, 1, 2, 3, or 4; preferably 0, 1, 2, or 3, preferably 0, 1, or 2; preferably 0, or 1;

$L^1$ is $-[CR^8R^9]_h-$, or $SiR^8R^9$; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl; $C_{5-8}$cycloalkenyl, $C_{6-8}$cycloalkenylalkyl, and $C_{6-12}$aryl; preferably $L^1$ is $SiR^8R^9$; preferably each of $R^8$, and $R^9$ are independently selected from the group consisting of hydrogen, or $C_{1-8}$alkyl;

M¹ is a transition metal selected from zirconium, or hafnium; and preferably zirconium; and Q¹ and Q² are each independently selected from the group consisting of halogen, $C_{1-8}$alkyl, $-N(R^{11})_2$, $C_{6-12}$aryl, and $C_{7-12}$aralkyl; wherein $R^{11}$ is hydrogen or $C_{1-8}$alkyl, preferably Q¹ and Q² are each independently selected from the group consisting of C, F, Br, I, methyl, benzyl, and phenyl.

25. The composition according to any one of statements 17-24, wherein each of $R^5$, $R^6$, and $R^7$, is independently selected from the group consisting of $C_{1-8}$alkyl, $C_{3-8}$alkenyl, $C_{3-8}$cycloalkyl, $C_{6-12}$aryl, and halogen; and r, s, t are each independently an integer selected from 0, 1, 2, 3, or 4; preferably 0, 1, 2, or 3, preferably 0, 1, or 2; preferably 0, or 1;

$L^2$ is $-[CR^8R^9]_h-$, or $SiR^8R^9$; wherein h is an integer selected from 1, or 2; each of $R^3$, and $R^9$ are independently selected from the group consisting of hydrogen, $C_{1-8}$alkyl, $C_{3-8}$alkenyl, $C_{3-8}$cycloalkyl; $C_{5-8}$cycloalkenyl, $C_{6-8}$cycloalkenylalkyl, and $C_{6-12}$aryl;

M² is a transition metal selected from zirconium, or hafnium; and preferably zirconium; and Q³ and Q⁴ are each independently selected from the group consisting of halogen, $C_{1-8}$alkyl, $-N(R^{11})_2$, $C_{6-12}$aryl, and $C_{7-12}$aralkyl; wherein $R^{11}$ is hydrogen or $C_{1-8}$alkyl, preferably Q¹ and Q² are each independently selected from the group consisting of C, F, Br, I, methyl, benzyl, and phenyl.

26. An olefin polymerization process, the process comprising: contacting a catalyst composition according to any one of statements 1-25, with an olefin monomer, optionally hydrogen, and optionally one or more olefin co-monomers; and polymerizing the monomer, and the optionally one or more olefin co-monomers, in the presence of the at least one catalyst composition, and optional hydrogen, thereby obtaining a polyolefin.

27. The process according to statement 26, wherein the process is conducted in one or more batch reactors, slurry reactors, gas-phase reactors, solution reactors, high pressure reactors, tubular reactors, autoclave reactors, or a combination thereof.

28. The process according to any one of statements 26-27, wherein the olefin monomer is ethylene, and the olefin comonomer comprises propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

29. The process according to any one of statements 26-27, wherein the olefin monomer is propylene, and the olefin comonomer comprises ethylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

30. An olefin polymer at least partially catalyzed by at least one catalyst composition according to any one of statements 1-25, or produced by the process according to any one of statements 26-29.

31. Olefin polymer according to statement 30, wherein said olefin polymer is polyethylene.

32. Olefin polymer according to statement 30, wherein said olefin polymer is polypropylene.

33. An article comprising the olefin polymer according to any one of statements 30-32.

The present invention provides a catalyst composition comprising catalyst component A comprising a bridged metallocene compound with two groups independently selected from indenyl or tetrahydroindenyl, each group being unsubstituted or substituted; preferably catalyst component A comprises a bridged metallocene compound with two indenyl groups, each indenyl being substituted with one or more substituents, wherein at least one of the substituent is an aryl, preferably a phenyl; wherein said aryl may be unsubstituted or substituted; preferably wherein the aryl, preferably the phenyl is on the 3-position on each indenyl;

catalyst component B comprising a bridged metallocene compound with a substituted or unsubstituted cyclopentadienyl group and a substituted or unsubstituted fluorenyl group;

an optional activator; an optional support; and an optional co-catalyst.

As used herein, the term "catalyst" refers to a substance that causes a change in the rate of a reaction. In the present invention, it is especially applicable to catalysts suitable for a polymerization, preferably for the polymerization of olefins to polyolefins.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, tetrahydroindenyl, fluorenyl or their derivatives. Metallocenes comprise a single metal site, which allows for more control of branching and molecular weight distribution of the polymer. Monomers are inserted between the metal and the growing chain of polymer. Specifically for this invention the catalyst needs to be a "bridged metallocene catalyst".

In one embodiment, the bridged metallocene catalyst can be represented by formula (III) for catalyst A, and formula (IV) for catalyst B: wherein

$$L^1(Ar^1)_2M^1Q^1Q^2 \qquad (III),$$

$$L^2(Ar^2)(Ar^3)M^2Q^3Q^4 \qquad (IV),$$

each $Ar^1$ is independently indenyl or tetrahydroindenyl, optionally substituted with one or more substituents each independently selected from the group consisting of alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl. Each indenyl or tetrahydroindenyl component may be substituted in the same way or differently from one another at one or more positions of either of the fused rings. Each substituent can be independently chosen. Preferably, each $Ar^1$ is indenyl, each indenyl being independently substituted with one or more substituents, wherein at least one of the substituent is an aryl or heteroaryl; preferably wherein the aryl or heteroaryl substituent is on the 3-position on each indenyl, wherein Ar1 can be further substituted with one or more substituents each independently selected from the group consisting of alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl;

$Ar^2$ is cyclopentadienyl, optionally substituted with one or more substituents each independently selected from the group consisting of alkyl, alkenyl, cycloalkyl, cycloalkenyl, or cycloalkenylalkyl, aryl, alkoxy, alkylaryl, arylalkyl, halogen, $Si(R^{10})_3$, heteroalkyl; wherein each $R^{10}$ is independently hydrogen, alkyl, or alkenyl;

$Ar^3$ is fluorenyl, optionally substituted with one or more substituents each independently selected from the group consisting of alkyl, alkenyl, cycloalkyl, cycloalkenyl, or cycloalkenylalkyl, aryl, alkoxy, alkylaryl, arylalkyl, halogen, $Si(R^{10})_3$, heteroalkyl; wherein each $R^{10}$ is independently hydrogen, alkyl, or alkenyl;

each of $M^1$ and $M^2$ is a transition metal selected from the group consisting of zirconium, hafnium, titanium, and vanadium; and preferably is zirconium;

$Q^1$ and $Q^2$ are each independently selected from the group consisting of halogen, alkyl, $-N(R^{11})_2$, alkoxy, cycloalkoxy, aralkoxy, cycloalkyl, aryl, alkylaryl, aralkyl, and heteroalkyl; wherein $R^{11}$ is hydrogen or alkyl;

$Q^3$ and $Q^4$ are each independently selected from the group consisting of halogen, alkyl, $-N(R^{11})_2$, alkoxy, cycloalkoxy, aralkoxy, cycloalkyl, aryl, alkylaryl, aralkyl, and heteroalkyl; wherein $R^{11}$ is hydrogen or alkyl;

$L^1$ is a divalent group or moiety bridging the two $Ar^1$ groups, preferably selected from $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl; preferably $L^1$ is $SiR^8R^9$;

$L^2$ is a divalent group or moiety bridging $Ar^2$ and $Ar^3$ groups, preferably selected from $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl.

In some embodiments, each $Ar^1$ is indenyl, each indenyl being independently substituted with one or more substituents, wherein at least one of the substituent is an aryl or heteroaryl; preferably wherein the aryl or heteroaryl substituent is on the 3-position on each indenyl; each indenyl being further optionally substituted with one or more substituents each independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-12}$alkyl; wherein each $R^{10}$ is independently hydrogen, $C_{1-20}$alkyl, or $C_{3-20}$alkenyl. Preferably each $Ar^1$ is indenyl, each indenyl being independently substituted with one or more substituents, wherein at least one of the substituent is an $C_{6-12}$aryl; preferably wherein the $C_{6-12}$aryl substituent is on the 3-position on each indenyl; each indenyl being further optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, $Si(R^{10})_3$, and heteroC$_{1-8}$alkyl; wherein each $R^{10}$ is independently hydrogen, $C_{1-8}$alkyl, or $C_{3-8}$alkenyl. Preferably each $Ar^1$ is indenyl, each indenyl being independently substituted with one or more substituents, wherein at least one of the substituent is an $C_{6-12}$aryl; preferably wherein the $C_{6-12}$aryl substituent is on the 3-position on each indenyl; each indenyl being further optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $Ar^2$ is cyclopentadienyl, optionally substituted with one or more substituents each independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-12}$alkyl; wherein each $R^{10}$ is independently hydrogen, $C_{1-20}$alkyl, or $C_{3-20}$alkenyl. Preferably $Ar^2$ is cyclopentadienyl, optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, $Si(R^{10})_3$, and heteroC$_{1-8}$alkyl; wherein each $R^{10}$ is independently hydrogen, $C_{1-8}$alkyl, or $C_{3-8}$alkenyl. Preferably $Ar^2$ is cyclopentadienyl, optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $Ar^3$ is fluorenyl, optionally substituted with one or more substituents each independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-12}$alkyl; wherein each $R^{10}$ is independently hydrogen, $C_{1-20}$alkyl, or $C_{3-20}$alkenyl. Preferably $Ar^2$ is fluorenyl, optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, $Si(R^{10})_3$, and heteroC$_{1-8}$alkyl; wherein each $R^{10}$ is independently hydrogen, $C_{1-8}$alkyl, or $C_{3-8}$alkenyl. Preferably, $Ar^3$ is fluorenyl, optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $L^1$ is —[$CR^8R^9$]$_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-12}$aryl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl. Preferably $L^1$ is —[$CR^8R^9$]$_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, and $C_7$-$C_{12}$arylalkyl; or $R^3$ and $R^9$ together with the atom to which they are attached form a $C_{3-8}$cycloalkyl, $C_{5-8}$cycloalkenyl or heterocyclyl. Preferably, $L^1$ is —[$CR^8R^9$]$_h$—, or $SiR^8R^9$; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, and $C_{6-12}$aryl. Preferably, $L^1$ is $SiR^8R^9$; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, and $C_{6-12}$aryl; preferably $C_{1-8}$alkyl.

In some embodiments, $Q^1$ and $Q^2$ are each independently selected from the group consisting of halogen, $C_{1-20}$alkyl, —$N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl. Preferably $Q^1$ and $Q^2$ are each independently selected from the group consisting of halogen, $C_{1-8}$alkyl, —$N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and heteroC$_{1-8}$alkyl; wherein $R^{11}$ is hydrogen or $C_{1-8}$alkyl. Preferably, $Q^1$ and $Q^2$ are each independently selected from the group consisting of halogen, $C_{1-8}$alkyl, —$N(R^{11})_2$, $C_{6-12}$aryl, and $C_{7-12}$aralkyl; wherein $R^{11}$ is hydrogen or $C_{1-8}$alkyl, preferably $Q^1$ and $Q^2$ are each independently selected from the group consisting of Cl, F, Br, I, methyl, benzyl, and phenyl.

In some embodiments, $L^2$ is —[$CR^8R^9$]$_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$ alkyl, $C_{3-20}$alkenyl, $C_{3-20}$cycloalkyl, $C_{5-20}$cycloalkenyl, $C_{6-20}$cycloalkenylalkyl, $C_{6-12}$aryl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl. Preferably $L^2$ is —[$CR^8R^9$]$_h$—, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-8}$alkyl, $C_{3-8}$ alkenyl, $C_{3-8}$cycloalkyl, $C_{5-8}$cycloalkenyl, $C_{6-8}$cycloalkenylalkyl, $C_{8-12}$aryl, and $C_7$-$C_{12}$arylalkyl; or $R^8$ and $R^9$ together with the atom to which they are attached form a $C_{3-8}$cycloalkyl, $C_{5-8}$cycloalkenyl or heterocyclyl. Preferably, $L^2$ is —[$CR^8R^9$]$_h$—, or $SiR^8R^9$; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, and $C_{6-12}$aryl.

In some embodiments, $Q^3$ and $Q^4$ are each independently selected from the group consisting of halogen, $C_{1-20}$ alkyl, —$N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl.

Preferably $Q^3$ and $Q^4$ are each independently selected from the group consisting of halogen, $C_{1-8}$alkyl, $-N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$ alkylaryl, $C_{7-12}$aralkyl, and heteroC$_{1-8}$alkyl; wherein $R^{11}$ is hydrogen or $C_{1-8}$alkyl. Preferably, $Q^3$ and $Q^4$ are each independently selected from the group consisting of halogen, $C_{1-8}$alkyl, $-N(R^{11})_2$, $C_{6-12}$aryl, and $C_{7-12}$aralkyl; wherein $R^{11}$ is hydrogen or $C_{1-8}$alkyl, preferably $Q^1$ and $Q^2$ are each independently selected from the group consisting of Cl, F, Br, I, methyl, benzyl, and phenyl.

In some preferred embodiments, catalyst component A comprises a bridged metallocene catalyst of formula (1I), more preferably catalyst component A comprises a bridged metallocene catalyst of formula (I); wherein

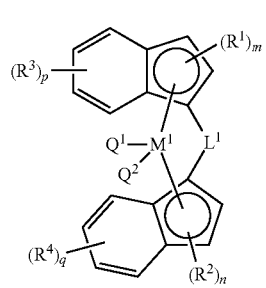

(1I)

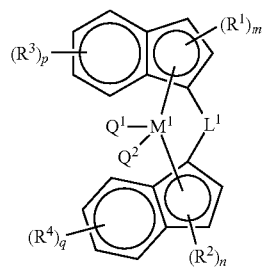

(I)

each dotted line represents an optional double bond
wherein each of $R^1$, $R^2$ $R^3$ and $R^4$, m, n, p, q, $L^1$, $M^1$, $Q^1$ and $Q^2$ have the same meaning as that defined herein above and in the statements.

A bridged metallocene catalyst component can appear in two stereo-isomeric forms: a racemic form and a meso form. In some preferred embodiments, catalyst component A is a meso bridged bis-indenyl metallocene compound, preferably of formula (I).

In some preferred embodiments, catalyst component B comprises a bridged metallocene catalyst of formula (II),

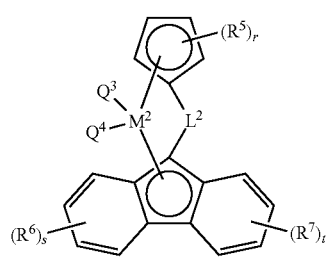

(II)

wherein each of $R^5$, $R^6$, $R^7$, r, s, t, $L^2$, $M^2$, $Q^3$ and $Q^4$ have the same meaning as that defined herein above and in the statements.

Non-Limiting Examples of Catalyst A are Shown Below

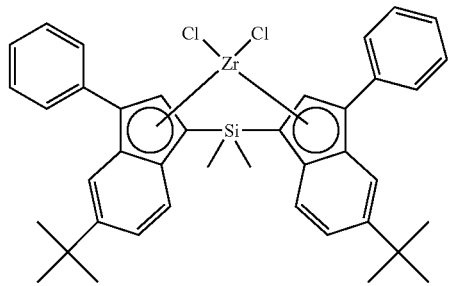

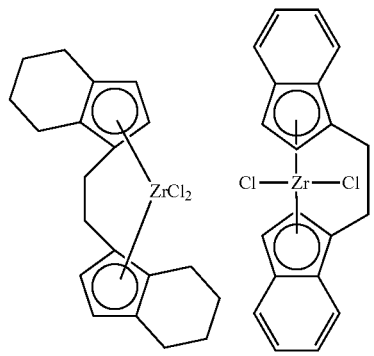

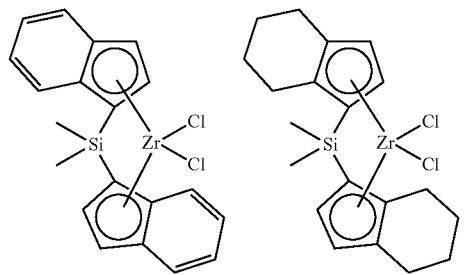

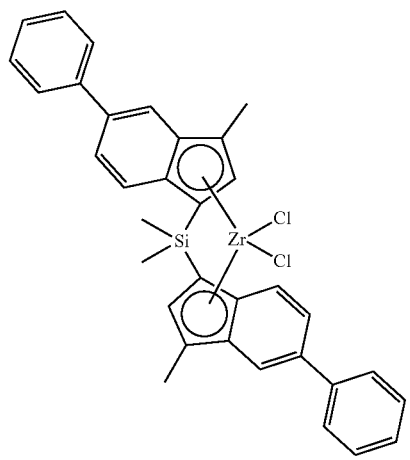

Preferred Examples of Catalyst A are Shown Below
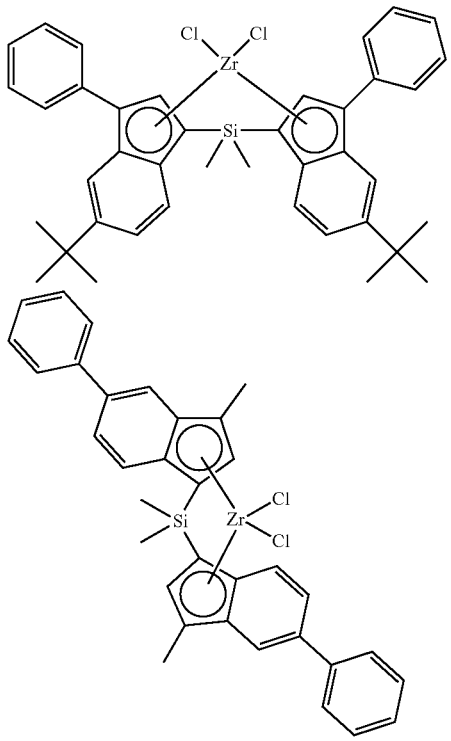
Non-Limiting Examples of Catalyst B are Shown Below
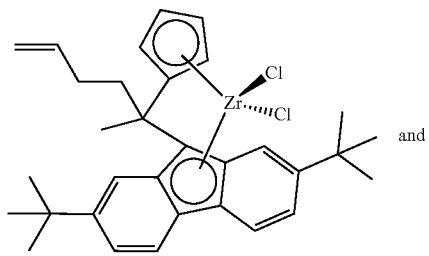
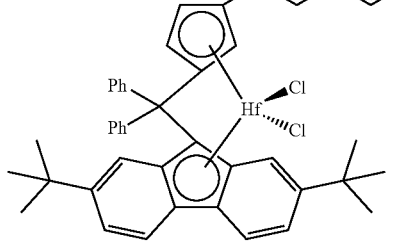
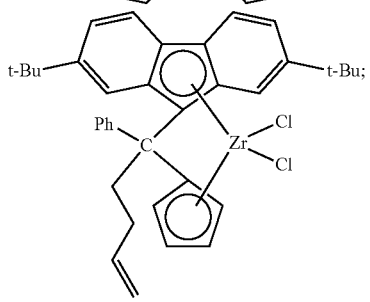
-continued
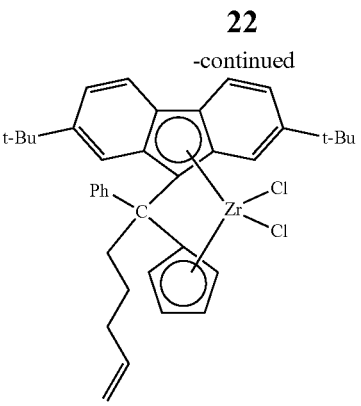
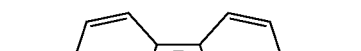
and
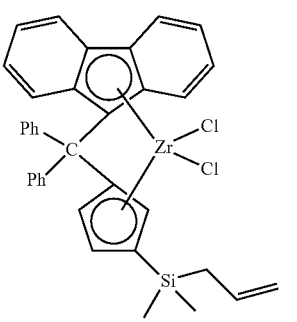

23
-continued
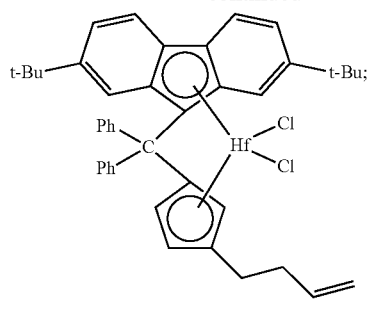
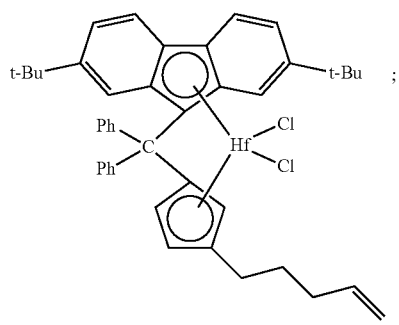
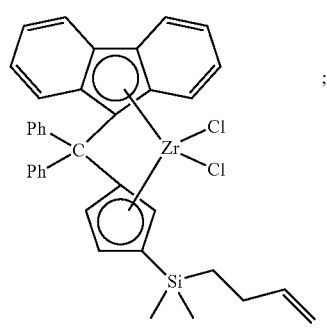
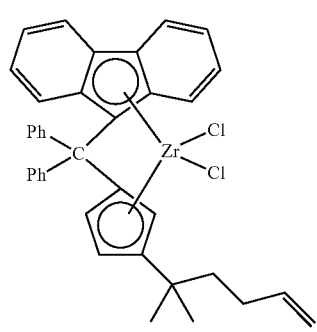
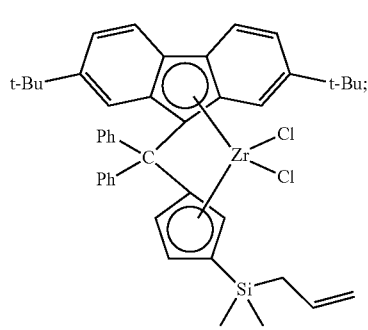
24
-continued
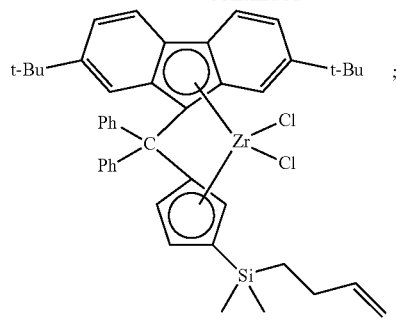
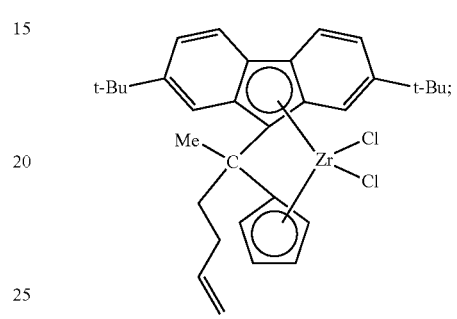
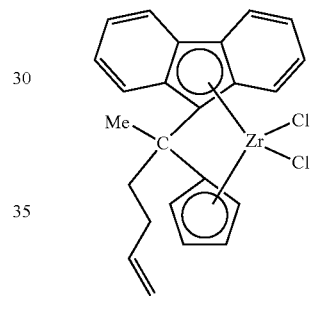
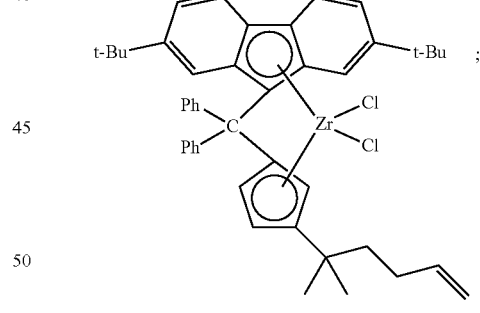
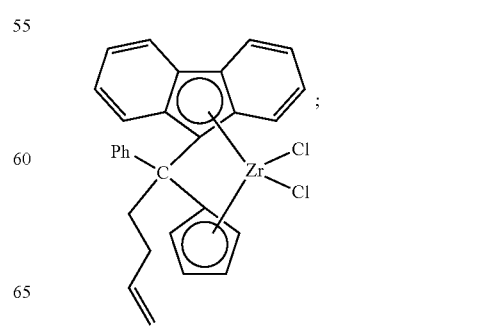

-continued
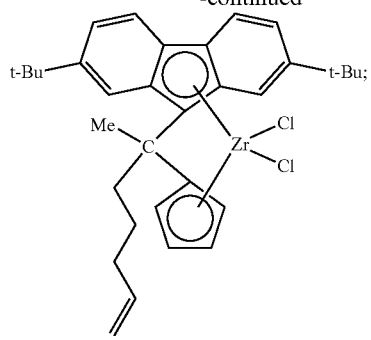
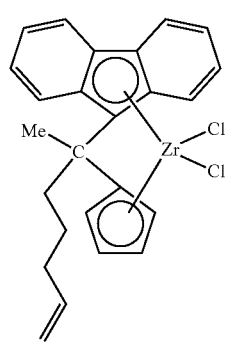
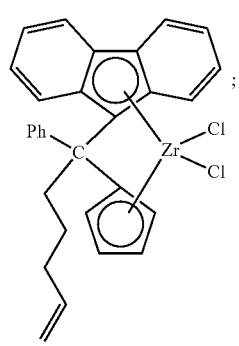
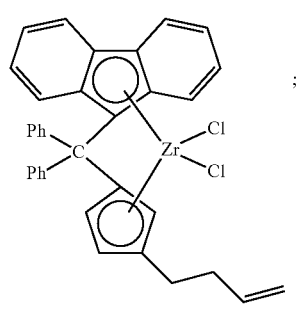
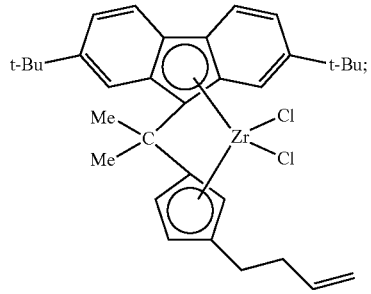
-continued
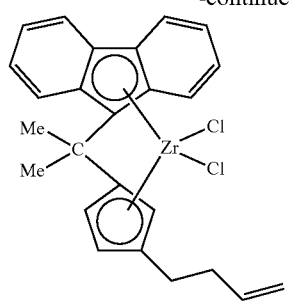
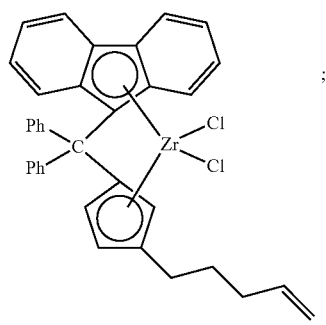
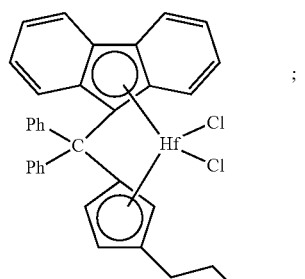
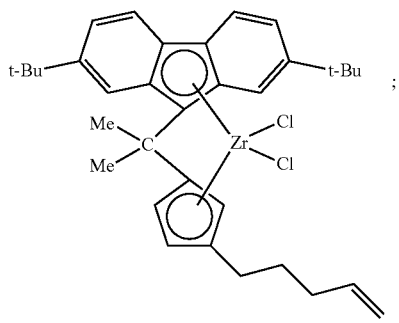
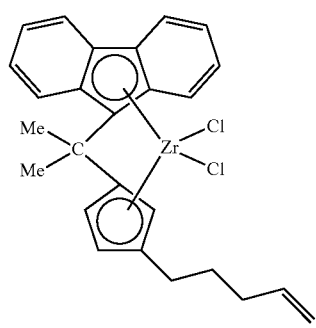

27
-continued
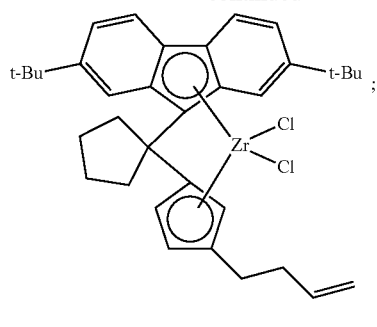
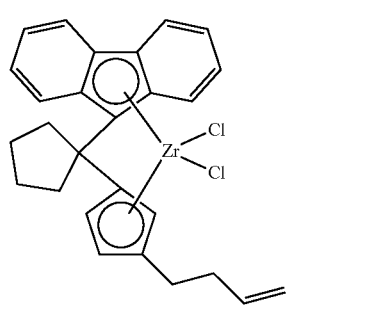
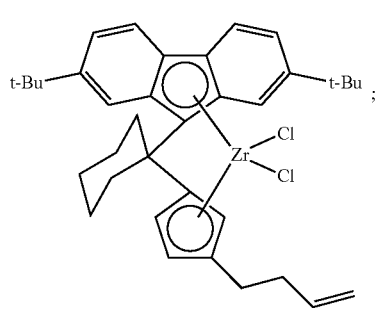
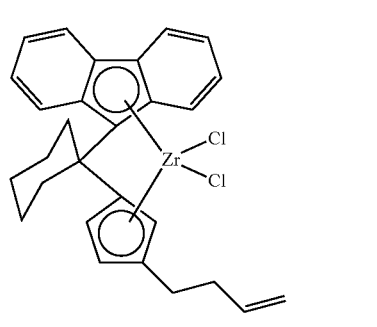
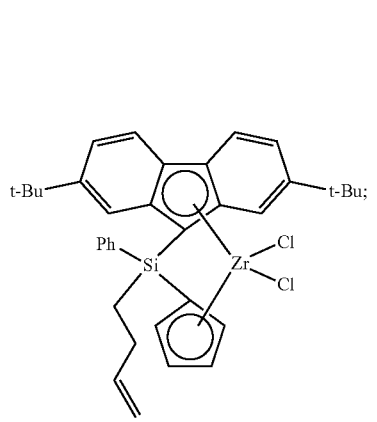
28
-continued
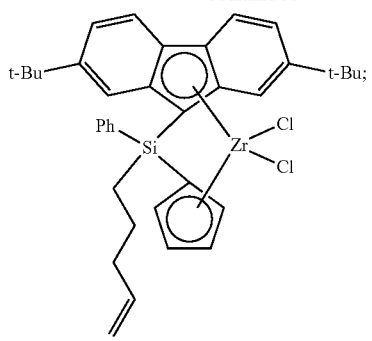
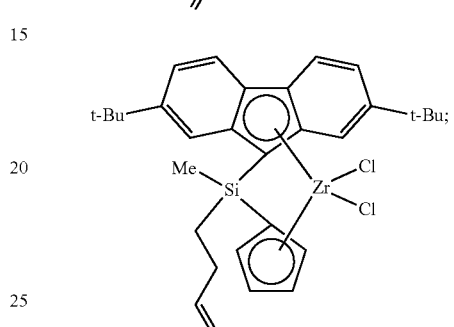
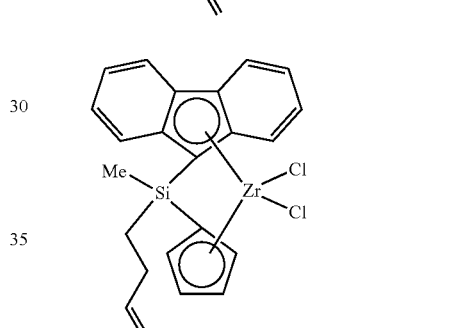
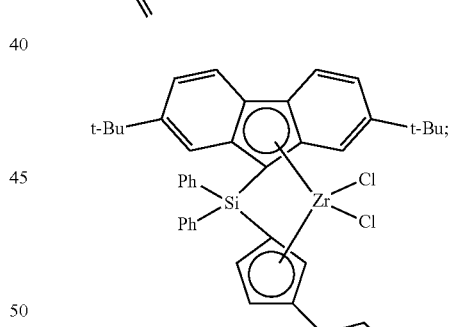
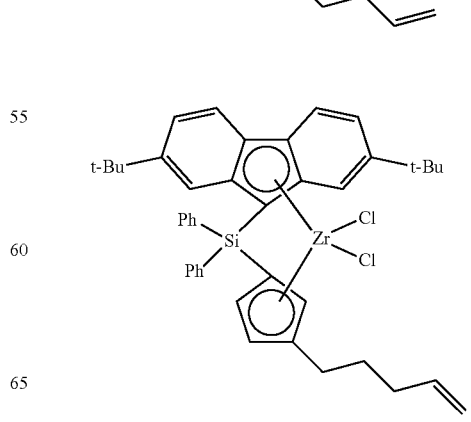

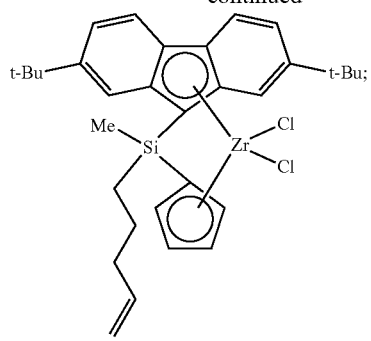
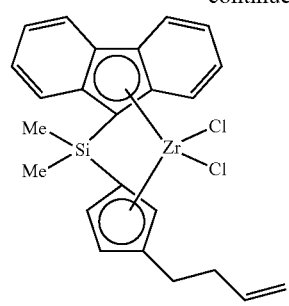
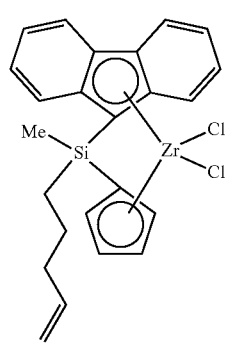
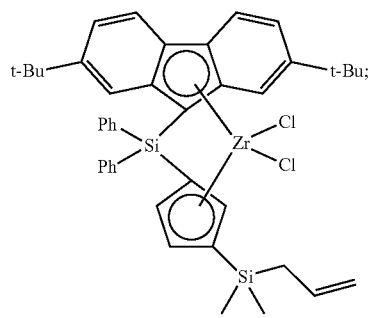
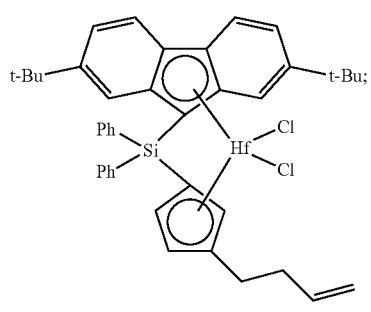
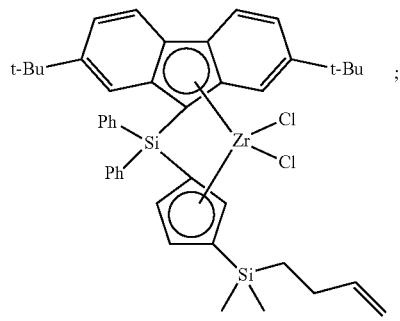
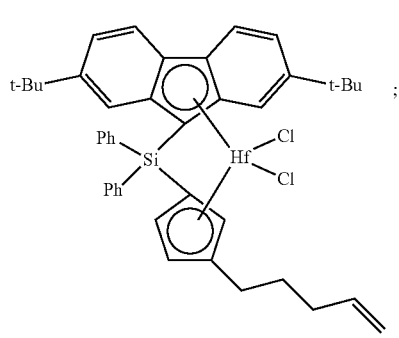
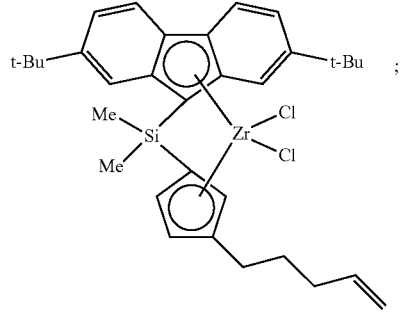
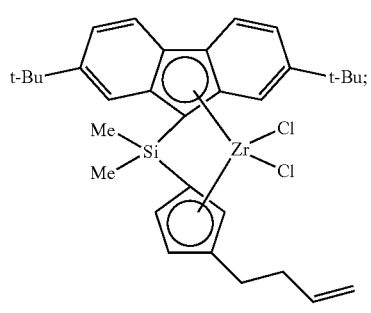
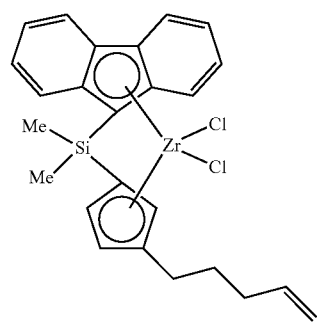

-continued

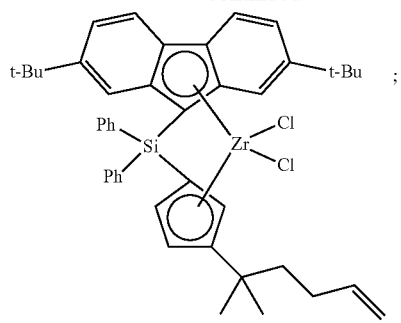

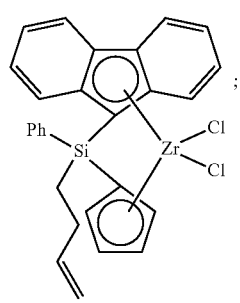

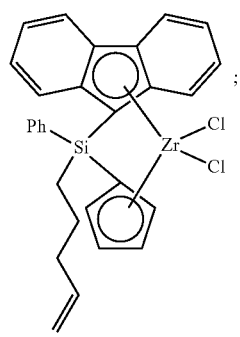

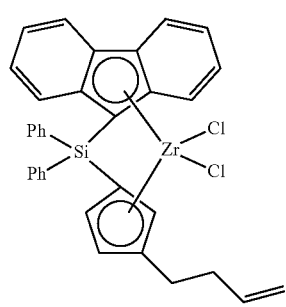

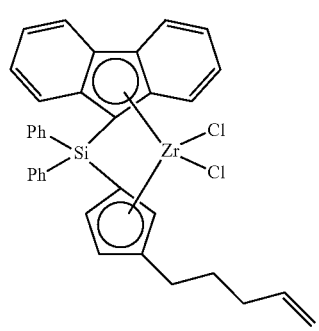

-continued

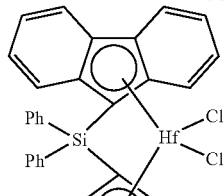

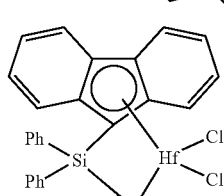

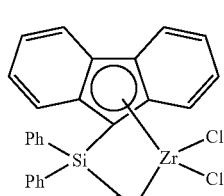

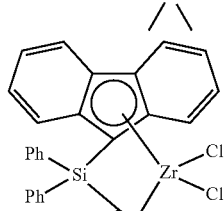

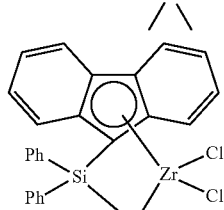

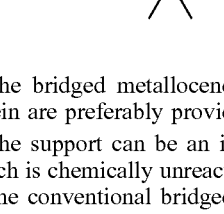

The bridged metallocene catalysts for the composition herein are preferably provided on a solid support.

The support can be an inert organic or inorganic solid, which is chemically unreactive with any of the components of the conventional bridged metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. For example the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof, preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof. Most preferred is a titanated silica, or a silica compound. In a preferred embodiment, the bridged metallocene catalysts are provided on a solid support, preferably a titanated silica, or a silica support. The silica may be in granular, agglomerated, fumed or other form.

In some embodiments, the support of the bridged metallocene catalysts is a porous support, and preferably a porous titanated silica, or silica support having a surface area comprised between 200 and 900 m²/g. In another embodiment, the support of the polymerization catalyst is a porous support, and preferably a porous titanated silica, or silica support having an average pore volume comprised between 0.5 and 4 ml/g. In yet another embodiment, the support of the polymerization catalyst is a porous support, and preferably a porous titanated silica, or silica support having an average pore diameter comprised between 50 and 300 Å, and preferably between 75 and 220 Å.

In some embodiments, the support has a D50 of at most 150 µm, preferably of at most 100 µm, preferably of at most 75 µm, preferably of at most 50 µm, preferably of at most 40 µm, preferably of at most 30 µm. The D50 is defined as the particle size for which fifty percent by weight of the particles has a size lower than the D50. The measurement of the particle size can be made according to the International Standard ISO 13320:2009 ("Particle size analysis-Laser diffraction methods"). For example, the D50 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 µm, by applying the theory of Mie, using appropriate optical means.

Preferably, the bridged metallocene catalyst is activated by an activator. The activator can be any activator known for this purpose such as an aluminum-containing activator, a boron-containing activator, or a fluorinated activator. The aluminum-containing activator may comprise an alumoxane, an alkyl aluminum, a Lewis acid and/or a fluorinated catalytic support.

In some embodiments, alumoxane is used as an activator for the bridged metallocene catalyst.

The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the bridged metallocene catalyst. In some embodiments, alumoxanes comprise oligomeric linear and/or cyclic alkyl alumoxanes. In a further embodiment, the alumoxane has formula (V) or (VI)

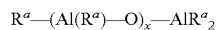  (V) for oligomeric, linear alumoxanes; or

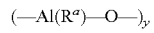  (VI) for oligomeric, cyclic alumoxanes wherein x is 1-40, and preferably 10-20;
wherein y is 3-40, and preferably 3-20; and
wherein each $R^a$ is independently selected from a $C_{1-8}$ alkyl, and preferably is methyl. In a preferred embodiment, the alumoxane is methylalumoxane (MAO).

The composition may comprise a co-catalyst. One or more aluminumalkyl represented by the formula $AlR^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminums, the most preferred being triisobutylaluminum (TIBAL) and triethylaluminum (TEAL).

In a preferred embodiment, the weight ratio of catalyst component A to catalyst component B is in a range of from 1:9 to 9:1, preferably, 1:5 to 5:1, preferably 1:4 to 4:1.

The catalyst composition can be particularly useful in a process for the preparation of a polymer comprising contacting at least one monomer with at least one catalyst composition. Preferably, said polymer is a polyolefin, preferably said monomer is an alpha-olefin.

The catalyst composition of the present invention is therefore particularly suitable for being used in the preparation of a polyolefin. The present invention also relates to the use of a catalyst composition in olefin polymerization.

The present invention also encompasses an olefin polymerization process, the process comprising: contacting a catalyst composition according to the invention, with an olefin monomer, optionally hydrogen, and optionally one or more olefin co-monomers; and polymerizing the monomer, and the optionally one or more olefin co-monomers, in the presence of the at least one catalyst composition, and optional hydrogen, thereby obtaining a polyolefin.

The term "olefin" refers herein to molecules composed of carbon and hydrogen, containing at least one carbon-carbon double bond. Olefins containing one carbon-carbon double bond are denoted herein as mono-unsaturated hydrocarbons and have the chemical formula $C_nH_{2n}$, where n equals at least two. "Alpha-olefins", "α-olefins", "1-alkenes" or "terminal olefins" are used as synonyms herein and denote olefins or alkenes having a double bond at the primary or alpha (α) position.

Throughout the present application the terms "olefin polymer", "polyolefin" and "polyolefin polymer" may be used synonymously.

Suitable polymerization includes but is not limited to homopolymerization of an alpha-olefin, or copolymerization of the alpha-olefin and at least one other alpha-olefin comonomer.

As used herein, the term "comonomer" refers to olefin co-monomers which are suitable for being polymerized with alpha-olefin monomer. The comonomer if present is different from the olefin monomer and chosen such that it is suited for copolymerization with the olefin monomer. Co-monomers may comprise but are not limited to aliphatic $C_2$-$C_{20}$ alpha-olefins. Examples of suitable aliphatic $C_3$-$C_{20}$ alpha-olefins include ethylene, propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. Further examples of suitable comonomers are vinyl acetate ($H_3C$—$C(=O)O$—$CH=CH_2$) or vinyl alcohol ("HO—$CH=CH_2$"). Examples of olefin copolymers suited which can be prepared can be random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

In some embodiments, the olefin monomer is ethylene, and the olefin comonomer comprises propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

In some embodiments, the olefin monomer is propylene, and the olefin comonomer comprises ethylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

The polyolefin can be prepared out in bulk, gas, solution and/or slurry phase. The process can be conducted in one or more batch reactors, slurry reactors, gas-phase reactors, solution reactors, high pressure reactors, tubular reactors, autoclave reactors, or a combination thereof.

The term "slurry" or "polymerization slurry" or "polymer slurry", as used herein refers to substantially a multi-phase composition including at least polymer solids and a liquid phase, the liquid phase being the continuous phase. The solids may include the catalyst and polymerized monomer.

In some embodiments, the liquid phase comprises a diluent. As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, C to C saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane or hexane.

The polymerization can also be performed in gas phase, under gas phase conditions. The term "gas phase conditions" as used herein refers to temperatures and pressures suitable for polymerizing one or more gaseous phase olefins to produce polymer therefrom.

The polymerization steps can be performed over a wide temperature range. In certain embodiments, the polymerization steps may be performed at a temperature from 20° C. to 125° C., preferably from 60° C. to 110° C., more preferably from 75° C. to 100° C. and most preferably from 78° C. to 98° C. Preferably, the temperature range may be within the range from 75° C. to 100° C. and most preferably from 78° C. to 98° C. Said temperature may fall under the more general term of polymerization conditions.

In certain embodiments, in slurry conditions, the polymerization steps may be performed at a pressure from about 20 bar to about 100 bar, preferably from about 30 bar to about 50 bar, and more preferably from about 37 bar to about 45 bar. Said pressure may fall under the more general term of polymerization conditions.

The invention also encompasses a polymer at least partially catalyzed by at least one composition according to the invention or produced by a process according to the invention.

The present invention also encompasses a polymer, preferably an olefin polymer produced by a process as defined herein. In some embodiments, said olefin polymer is polyethylene. In some embodiments, said olefin polymer is polypropylene.

After the polymer is produced, it may be formed into various articles, including but not limited to, film products, caps and closures, rotomoulding, grass yarn, etc.

The present invention therefore also encompasses an article comprising a polymer as defined herein; preferably a polyolefin as defined herein, or obtained according to a process as defined herein. In some embodiments, said article is film products, caps and closures, rotomoulding, grass yarn, pipes, etc.

The invention will now be illustrated by the following, non-limiting illustrations of particular embodiments of the invention.

EXAMPLES

Test Methods

The density of the polyolefin was measured according to the method of standard ISO 1183-1:2012 method A at a temperature of 23° C.

The melt flow rate MI2 was measured according to ISO 1133:1997, condition D, at 190° C. and under a load of 2.16 kg.

The molecular weight ($M_n$ (number average molecular weight), $M_w$ (weight average molecular weight) and molecular weight distributions d ($M_w/M_n$), and d' ($M_z/M_w$) were determined by size exclusion chromatography (SEC) and in particular by gel permeation chromatography (GPC). Briefly, a GPC-IR5 from Polymer Char was used: 10 mg polymer sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight $M_i$ of each fraction i of eluted polymer is based on the Mark-Houwink relation ($\log_{10}(M_{PE})=0.965909 \times \log 10(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$)

molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. hi is the height (from baseline) of the SEC curve at the $i_{th}$ elution fraction and $M_i$ is the molecular weight of species eluting at this increment.

Rheology long chain branching index $g_{rheo}$ was measured according to the formula, as described in WO 2008/113680:

$$g_{rheo}(PE) = \frac{M_w(SEC)}{M_w(\eta_o, MWD, SCB)}$$

wherein Mw (SEC) is the weight average molecular weight obtained from size exclusion chromatography expressed in kDa; and wherein Mw ($\eta_0$, MWD, SCB) is determined according to the following, also expressed in kDa:

$$M_w(\eta_0, MWD, SCB) = \exp(1.7789 + 0.199769 LnM_n + 0.209026(Ln\, \eta_o) + 0.955(\ln \rho) - 0.007561(LnM_z)(Ln\, \eta_o) + 0.02355(\ln M_z)^2)$$

wherein the zero shear viscosity $\eta_0$ in Pa·s is obtained from a frequency sweep experiment combined with a creep experiment, in order to extend the frequency range to values down to $10^{-4}$ s$^{-1}$ or lower, and taking the usual assumption of equivalence of angular frequency (rad/s) and shear rate; wherein zero shear viscosity $\eta_0$ is estimated by fitting with Carreau-Yasuda flow curve ($\eta$–W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%; wherein the apparatus used is an AR-G2 manufactured by TA instruments.

The total co-monomer content, especially 1-hexene (wt % C6) relative to the total weight of the ethylene polymer and the molar fraction of hexene co-monomer in sequences of length one relative to the co-monomer content are determined by $^{13}$C NMR analysis according to the state of the art of $^{13}$C NMR analysis of ethylene based polyolefins.

The $^{13}$C NMR analysis was performed under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data were acquired using proton decoupling, several hundred even thousands scans per spectrum, at a temperature of 130° C. The sample was prepared by dissolving a sufficient amount of polymer in 1,2,4-trichlorobenzene (TCB 99% spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 to 600 mg of polymer were dissolved in 2.0 ml of TCB, followed by addition of 0.5 ml of C6D6 and 2 to 3 drops of HMDS. The chemical shifts are referenced to the signal of the internal standard HMDS, which is assigned a value of 2.03 ppm. $^{13}$C NMR observed signals are assigned according to the co-monomer involved and corresponding literature. The following non-exhaustive literature references can be used: G. J. Ray et al. in Macromolecules, vol 10, no 4, 1977, p. 773-778 and Y. D Zhang et al in Polymer Journal, vol 35, no 7, 2003, p. 551-559. The total co-monomer content relative to the total weight of ethylene polymer is determined from the appropriate peaks area combination, a well-known method to the skilled person.

Structure of Catalysts:

1. Metallocene 1

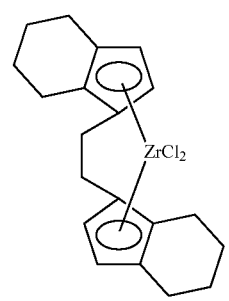

(1)

Dichloro[rac-ethylenebis(4,5,6-tetrahydro-1-indenyl)]zirconium was purchased from Boulder Scientific Company (CAS 100163-29-9).

2. Metallocene 2 Bis(nBuCp)HfCl$_2$

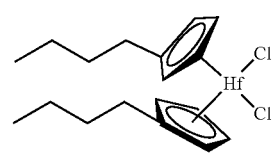

(2)

Bis(n-butylcyclopentadienyl)hafnium dichloride was purchased from Chemtura (CAS 85722-08-3).
3. Metallocene 3
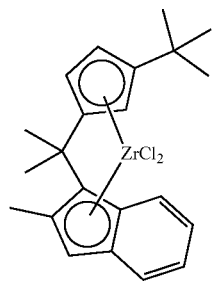
(3)
This metallocene was synthesized as described in U.S. Pat. No. 6,376,418 B1.
4. Metallocene 4
Metallocene 4 was prepared as described below and as shown under Scheme 1. Unless otherwise stated, all syntheses were performed under nitrogen atmosphere using dry solvents.
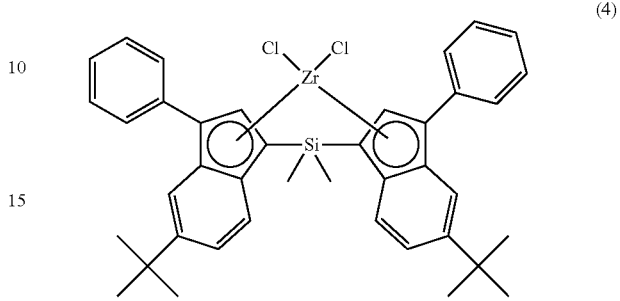
(4)
Scheme 1
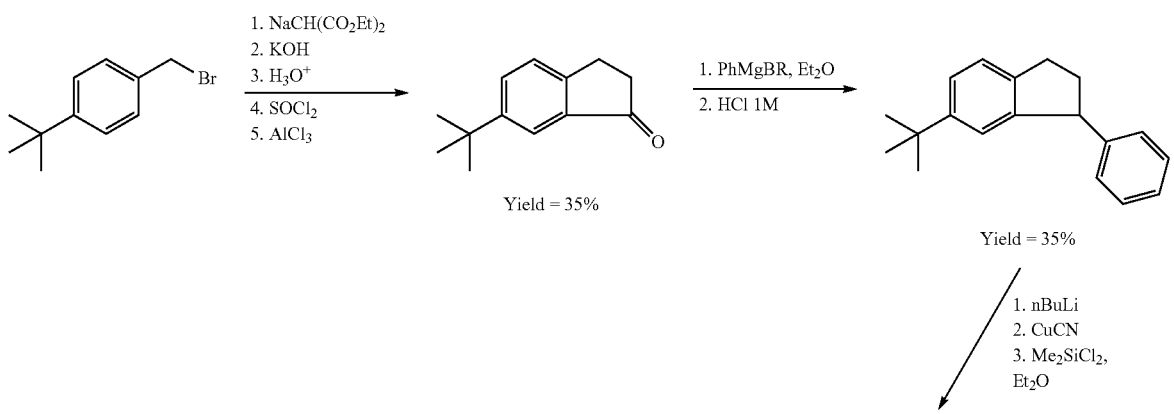
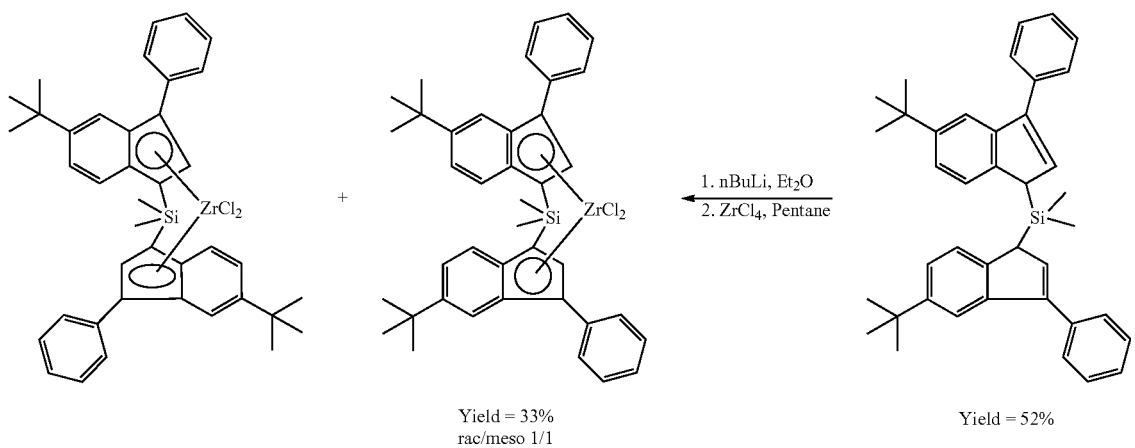

Step 1:

To a solution of 3.52 g (0.022 mol) of diethyl malonate in 25 ml of THF, 0.88 g (60% in oil, 0.022 mol) of sodium hydride was added at 0° C. This mixture was refluxed for 1 hour and then cooled to room temperature. Then, 5 g (0.022 mol) of 4-tBu-benzylbromide was added, and the resulting mixture was refluxed for 3 hours. A precipitate formed (NaBr). This mixture was cooled to ambient temperature and filtered through a glass frit (G2). The precipitate (NaBr) was additionally washed with 3×5 ml of THF. The combined filtrates were evaporated to dryness and compound was used without further purification.

The residue was dissolved in 20 ml of ethanol and 2.5 ml of water were added then 8 g of potassium hydroxide at 0° C. The resulting mixture was refluxed for 2 h, and then 10 ml of water was added. Ethanol was distilled off under reduced pressure and controlled temperature (max 30° C.). The resulting aqueous solution was acidified with HCl to pH 1 and the product was extracted with ether (3×100 mL). The combined organic fractions were washed with HCl 1 M (1×25 ml) and brine (1×25 ml) then dried over $MgSO_4$ and concentrated under reduced pressure and compound was used without further purification.

The product was decarboxylated by heating for 2 hours at 160° C. (a gas evolution was noticed). The product obtained was dissolved in 30 ml of dichloromethane, and 30 ml of $SOCl_2$ was added. The mixture was refluxed for 3 hours and then evaporated to dryness.

The residue was dissolved in 12 ml of dry dichloromethane, and the solution obtained was added dropwise to a suspension of 6.5 g (0.05 mol) of $AlCl_3$ in 68 ml of dichloromethane for 1 hour at 0° C., while vigorously stirring. Then, the reaction mixture was refluxed for 3 hours, cooled to ambient temperature, poured on 250 cm³ of ice, and extracted with DCM (3×50 ml).

The organic layer was washed with HCl 1M and brine (1×25 ml each). The combined organic fractions were dried over $MgSO_4$ and then evaporated to dryness. The product was isolated by filtration over silica (1 to 10% AcOEt in isopentane). The desired product was a yellow oil (Yield=35%).

$^1$H NMR (500 MHz, $CDCl_3$) δ: 1.35 (s, 9H; $CH_3$); 2.72 (m, 2H, $CH_2$-Ph); 3.10 (m, 2H, $CH_2$—C=O); 7.44 (m, 1H, CHar.); 7.67 (m, 1H, CHar.); 7.79 (m, 1H, CHar.)

Step 2:

6-tBu-1-indanone (1 eq., 5.078 g) was dissolved in 80 mL of $Et_2O$. PhMgBr (1.1 eq., 10 mL, 3M) was added at 0° C. dropwise and the solution was heated at reflux during 2 hours and then stirred overnight at room temperature. After overnight stirring, the reaction was slowly quenched with 50 mL of 1 M HCl and stirred during 1 hour. The mixture was neutralized with saturated solution of $NaHCO_3$ and extracted with diethyl ether (×2). The combined organic layer was dried over magnesium sulfate and the solvent was removed under reduced pressure. The product was isolated as a slightly yellow oil (6.54 g, 95%) and used without purification.

Step 3:

2 g (8 mmol) of 6-tBu-(phenyl)-1-indene were introduced into 50 mL of diethyl ether, and 5.3 mL of n-butyllithium (1.6 M in hexane) was added dropwise at 0° C. After this addition was complete, the mixture was stirred at room temperature overnight. A catalytic amount of CuCN (5 mol %) was added and the resulting solution was stirred during 30 minutes then 0.49 mL of (dimethyl)dichlorosilane (4 mmol) were added in one portion. After this addition, the reaction solution was stirred overnight at room temperature.

The reaction mixture was filtered through alumina and the solvent was removed in vaccuo. The product was purified by silica gel flash column chromatography with hexane/DCM (9/1) as eluent to obtain an orange powder. Yield=52%.

$^1$H NMR (500 MHz, $CDCl_3$) δ: −0.15 (s, 6H, $CH_3Si$); 1.35 (s, 18H, $(CH_3)_3C$); 3.69 (d, J=7 Hz, 2H, CH—Si); 6.32 (d, J=7 Hz, 2H, CH=); 7.30 (m, 2H, CHar.); 7.35-7.48 (m, 8H, CHar.); 7.61 (m, 4H, CHar.); 7.70 (m, 2 h, CHar.)

Step 4:

In a glove-box, 0.43 g of bis-indenyl proligand was introduced in a flask and 20 mL of diethyl ether was added. 0.54 mL of n-butyllithium solution (1.6 M in hexane) was added dropwise at room temperature. After this addition was complete, the mixture was stirred overnight at this temperature. Solvent was removed, the solid was washed with pentane twice and then dry pentane (20 mL) was added. 0.181 g of zirconium tetrachloride (1 eq.) was added in small portions. The solution was stirred for two days at room temperature. The precipitate that forms was separated by filtration and washed twice with pentane. Solvent was removed and the resulting orange solid was dried under vacuum (0.365 g). The desired complex was obtained as a rac/meso ratio of 1/1 and was used as such in the polymerization experiments. Yield=33%.

$^1$H NMR (500 MHz, $CD_2C_2$) δ 0.91 (s, 6H, $CH_3Si$); 1.32 (s, 18H, $CH_3$—C); 6.05 (s, 2H, CHar.); 7.05-7.20 (m, 2H, CHar.); 7.20-7.30 (m, 2H, CHar.); 7.40 (m, 4H, CHar.); 7.55 (m, 4H, CHar.); 7.68 (s, 2H, CHar.); 7.97 (m, 2H, CHar.)

5. Metallocene 5 (Butenyl)MeC(Cp)(2,7-tBu2-Flu)ZrCl2

Metallocene 5 was prepared as described below, following the synthesis described in Journal of Organometallic Chemistry vol. 553, 1998, p. 205-220:

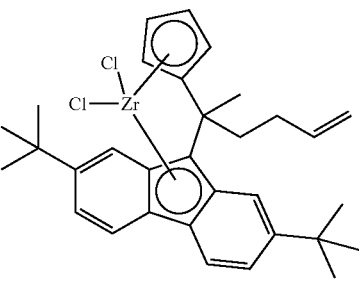

(5) Step 1:

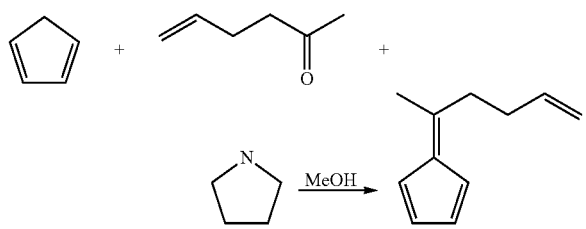

Into a 200 mL 3-neck flask equipped with a gas inlet tube and a magnetic stirring bar was charged, under nitrogen, 2.5 eq of freshly cracked cyclopentadiene and 1 eq of 5-hexene-2-one in 60 mL of methanol. Then, 2 eq of pyrrolidine was added dropwise at 0° C. and the mixture was stirred overnight at room temperature. The reaction was quenched with 50 mL of HCl 1M and extracted with $Et_2O$ (3×50 mL). Organic fractions were dried over $MgSO_4$ and solvent was removed under reduced pressure. The fulvene was obtained as a yellow oil and used without further purification (Yield=65%).

Step 2:

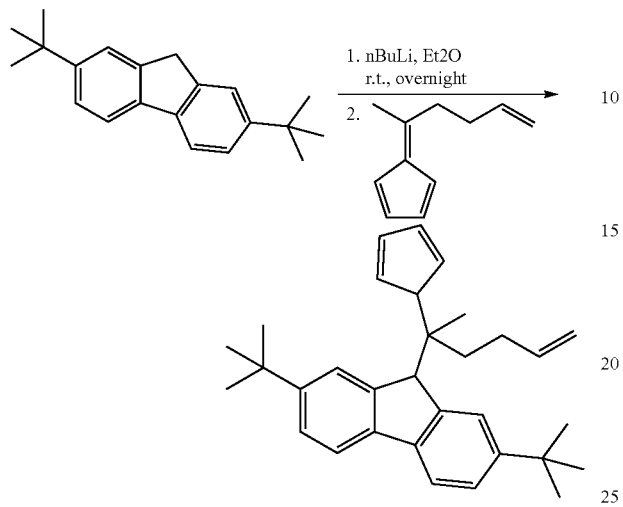

In a 3-neck flask, 1 eq of di-tert-butylfluorene was added under flow of nitrogen and dissolved in 70 mL of Et$_2$O. 1.1 eq of n-BuLi (1.6M in hexane) was added dropwise at 0° C. to this solution and the mixture was stirred overnight at room temperature. A solution of 3.5 g of fulvene prepared in the previous step, dissolved in 30 mL of Et$_2$O was added dropwise. The reaction mixture was allowed to stir overnight. Reaction was quenched with water and extracted with Et$_2$O (3×50 mL). Combined organic fractions were dried over MgSO$_4$ and solvent was removed under reduced pressure. The product was crystallized in pentane/MeOH at 0° C. to afford a white solid (Yield=85%).

Step 3:

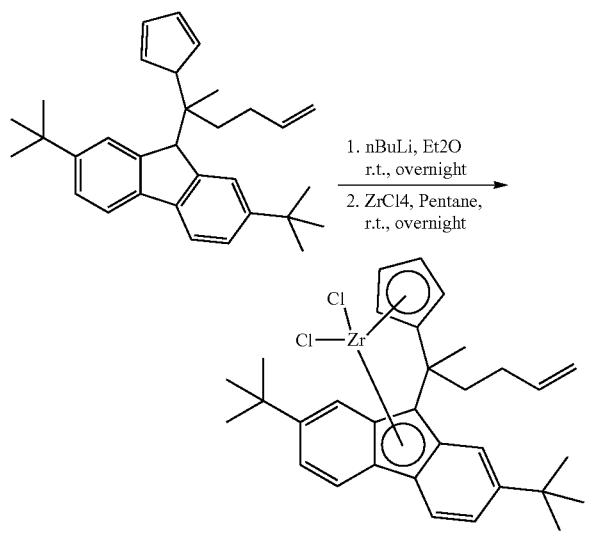

In a round-bottomed flask, 1 g of ligand was introduced and dissolved in 40 mL of Et$_2$O. 2.1 eq. of nBuLi was added dropwise and the mixture was stirred overnight at room temperature. Solvent was removed under vacuum and 40 mL of dry pentane was added. Then 1 eq of ZrCl$_4$ was added in small portions at room temperature. The reaction was stirred over 2 days and filtered. The resulting precipitate was diluted in DCM and centrifuged to eliminate lithium chloride. Solvent was removed under vacuum to afford a pink-red powder (Yield=70%).

$^1$H NMR (500 MHz, CD$_2$Cl$_2$) δ 1.34 (s, 9H, CH$_3$ tBu); 1.36 (s, 9H, CH$_3$ tBu); 2.30 (m, CH$_2$ alk); 2.43 (s, 3H, CH$_3$); 2.55 (m, 1H, CH$_2$ alk.); 2.65 (m, 1H, CH$_2$ alk.); 3.25 (m, 1H, CH$_2$ alk.); 5.13 (m; 1H, CHvinyl); 5.18 (m; 1H, CHvinyl); 5.70 (m, 2H, CHcp); 6.10 (m; 1H, CHvinyl); 6.29 (m, 2H, CHcp); 7.55 (s, 1H, CHflu), 7.63-7.68 (m, 2H, CHflu); 7.72 (s, 1H, CHflu); 8.00-8.04 (m, 2H, CHflu)

6. Metallocene 6: EBI Catalyst

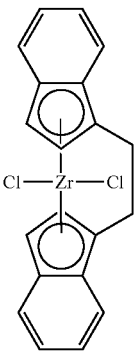

Dichloro[rac-ethylenebis(1-indenyl)]zirconium was purchased from MCAT Gmbh (CAS 100080-82-8).

7. Synthesis of Supported Catalysts

All catalyst and co-catalyst experimentations were carried out in a glove box under nitrogen atmosphere. Methylaluminoxane (30 wt %) (MAO) in toluene from Albemarle was used as the activator. Titanated silica from PQ (PD12052) was used as catalyst support (D50: 25 μm).

Supported metallocene catalysts were prepared in two steps using the following method:

1. Impregnation of MAO on Silica:

Ten grams of dry silica (dried at 450° C. under nitrogen during 6 h) was introduced into a round-bottomed flask equipped with a mechanical stirrer and a slurry was formed by adding 100 ml of toluene. MAO (21 ml) was added dropwise with a dropping funnel. The reaction mixture was stirred at 110° C. during 4 hours. The reaction mixture was filtered through a glass frit and the powder was washed with dry toluene (3×20 ml) and with dry pentane (3×20 ml). The powder was dried under reduced pressure overnight to obtain a free flowing grey powder.

2. Deposition of Metallocene on Silica/MAO Support:

Silica/MAO (10 g) was suspended in toluene (100 ml) under nitrogen. Metallocenes A and B (total amount of metallocene=0.2 g) were introduced and the mixture was stirred 2 hours at room temperature. The reaction mixture was filtered through a glass frit and the powder was washed with dry toluene (3×20 ml) and with dry pentane (3 times). The powder was dried under reduced pressure overnight to obtain a free flowing grey powder.

The catalyst compositions prepared are shown in Table 1.

TABLE 1

| Catalyst Composition | Ratio catalyst A:catalyst B |
|---|---|
| Met 4/Met 2 | 1:1 |
| Met 3/Met 1 | 1:1 |
| Met 3/Met 2 | 1:4 |
| Met 2/Met 5 | 4:1 |
| Met 1/Met 5 | 1:1 |
| Met 4/Met 5 | 1.5:1 |
| Met 6/Met 5 | 1:1 |

8. Polymerizations

Polymerization reactions were performed in a 132 ml autoclave with an agitator, a temperature controller and inlets for feeding of ethylene and hydrogen. The reactor was dried at 110° C. with nitrogen during one hour and then cooled to 40° C.

All polymerizations were performed under the conditions depicted in table 2 (unless otherwise stated). The reactor was loaded with 75 ml of isobutane, 1.6 ml of 1-hexene and pressurized with 23.8 bar of ethylene with 800 ppm of hydrogen. Catalyst (3.5 mg) was added. Polymerization started upon catalyst suspension injection, was performed at 85° C. and was stopped after 60 minutes by reactor depressurization. Reactor was flushed with nitrogen prior opening.

TABLE 2

| Conditions | Unit | Reactor |
|---|---|---|
| Isobutane (iC4) | L | 0.075 |
| Triisobutylaluminum (TIBAL) | ppm | 100 |
| 1-hexene | wt %* | 2.44 |
| Hydrogen | ppm | 800** |
| Temperature | ° C. | 85 |
| Ethylene pressure | bar | 23.8 |

*In comparison to iC4
**in ethylene feed

The results for the single catalysts are shown in Table 3.

TABLE 3

Polymerization of ethylene with single catalysts

| Catalyst | Activity (g/g/h) | MI$_2$ (g/10 min) | M$_n$ (kDa) | M$_w$ (kDa) | M$_z$ (kDa) | M$_w$/M$_n$ | M$_z$/M$_w$ | Tm (° C.) | Density g/cm$^3$ | grheo | % wt C6 |
|---|---|---|---|---|---|---|---|---|---|---|---|
| Met 1 | 6477 | 1.0 | 29.1 | 77.4 | 154.7 | 2.7 | 2.0 | 121.0 | 0.936 | 0.77 | 3.1 |
| Met 2 | 462 | 2.1 | 28.1 | 87.4 | 671.0 | 3.1 | 7.7 | 121.4 | 0.935 | 0.95 | 3.3 |
| Met 3 | 3040 | 37.5 | 12.2 | 43.8 | 173.7 | 3.6 | 4.0 | 118.9 | 0.939 | 0.81 | 5.4 |
| Met 4 | 2678 | 50.4 | 9.8 | 36.2 | 493.1 | 3.7 | 13.6 | 127.8 | 0.958 | 0.72 | 0.6 |
| Met 5 | 4787 | 0.5 | 50.4 | 124.1 | 294.7 | 2.5 | 2.4 | 112.4 | 0.917 | 0.82 | 7.9 |
| Met 6 | 7925 | 1.5 | 19.1 | 106.8 | 422.5 | 5.6 | 4.4 | 119.4 | 0.938 | 0.59 | 4.6 |

The results for the dual catalysts are shown in Tables 4 and 5.

TABLE 4

Polymerization of ethylene with dual catalysts

| Example | Composition | Ratio catalyst | Activity (g/g/h) | MI$_2$ (g/10 min) | M$_n$ (kDa) | M$_w$ (kDa) | M$_z$ (kDa) | M$_w$/M$_n$ | M$_z$/M$_w$ | Tm (° C.) | Density | grheo | % wt C6 |
|---|---|---|---|---|---|---|---|---|---|---|---|---|---|
| 1(comparative) | Met4/Met2 | 1:1 | 740 | 17.5 | 11 | 43 | 674 | 3.9 | 15.6 | 126.6 | 0.954 | — | 2.8 |
| 2(comparative) | Met3/Met1 | 1:1 | 6307 | 1.2 | 27 | 75 | 143 | 2.8 | 2.0 | 123.9 | 0.940 | 0.75 | 3.2 |
| 3(comparative) | Met3/Met2 | 1:4 | 1362 | 3.0 | 15 | 65 | 208 | 4.4 | 3.2 | 122.0 | 0.942 | 0.80 | 2.8 |
| 4(comparative) | Met2/Met5 | 4:1 | 2590 | 0.1 | 46 | 188 | 562 | 4.1 | 3.0 | 119.1 | 0.933 | 0.76 | 2.8 |
| 5 | Met1/Met5 | 1:1 | 7164 | 0.1 | 27 | 140 | 437 | 5.2 | 3.1 | 122.7 | 0.938 | 0.90 | 4.3 |
| 6 | Met4/Met5 | 1.5:1 | 2320 | 0.1 | 26 | 157 | 560 | 6.1 | 3.6 | 119.9 | 0.934 | 0.79 | 5.4 |
| 7(comparative) | Met6/Met5 | 1:1 | 10881 | 0.2 | 26 | 119 | 344 | 4.5 | 2.9 | 122.1 | 0.935 | 0.88 | 3.9 |

TABLE 5

Polymerization of ethylene with dual catalysts

| Example | Composition | Ratio catalyst | H$_2$ (ppm) | Activity (g/g/h) | MI$_2$ (g/10 min) | Mn (kDa) | Mw (kDa) | Mz (kDa) | M$_w$/M$_n$ | M$_z$/M$_w$ | Tm (° C.) | Density g/cm$^3$ | grheo |
|---|---|---|---|---|---|---|---|---|---|---|---|---|---|
| 8 | Met4/Met5 | 1.5:1 | 800 | 4800 | 0.6 | 16 | 127 | 510 | 7.9 | 4 | 126.1 | 0.947 | 0.76 |

The activity as a function of hydrogen concentration was also studied for three catalyst compositions with different ratio of Met1/Met5. The polymerization conditions were the same as listed in Table 2 except for the hydrogen concentration. The results are shown in FIG. 1.

Figure 3:
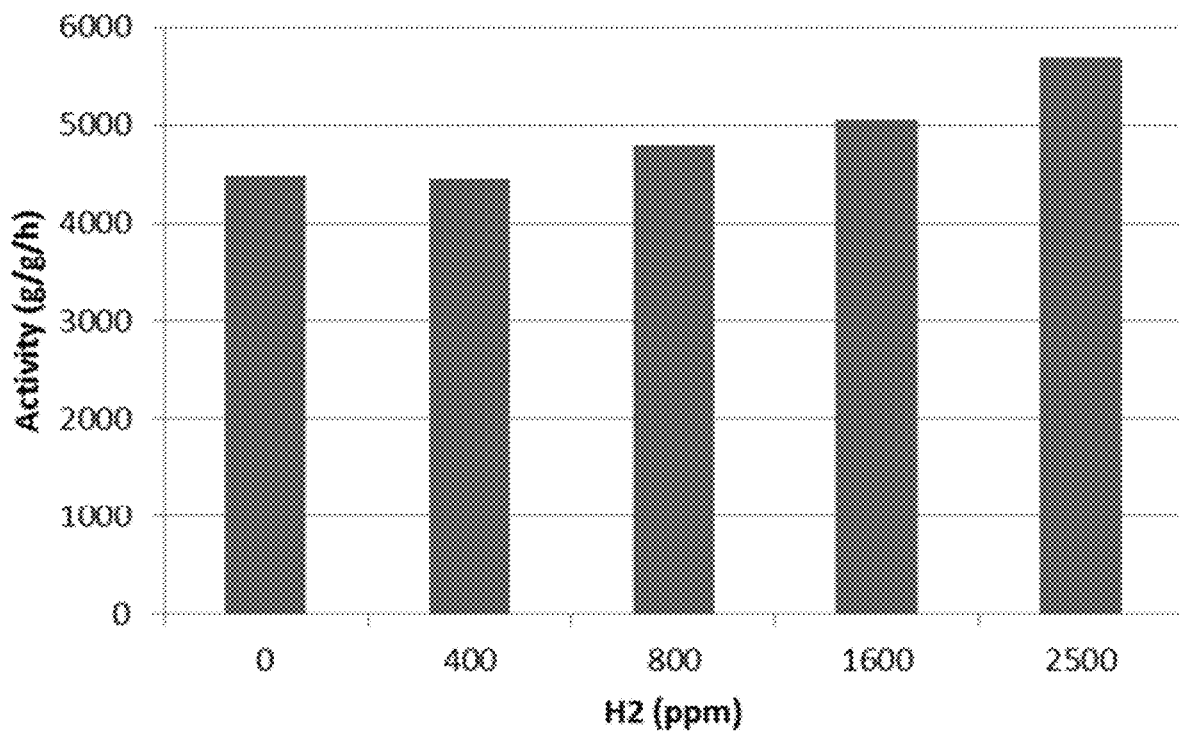
FIG. 3 represents a graph plotting the activity of a catalyst composition Met4/Met5 as a function of hydrogen concentration.

The activity as a function of hydrogen concentration was also studied for a catalyst composition Met4/Met5 1.5:1 (60/40) ratio. The polymerization conditions were the same as listed in Table 2. The results are shown in FIG. 3.

Figure 4:
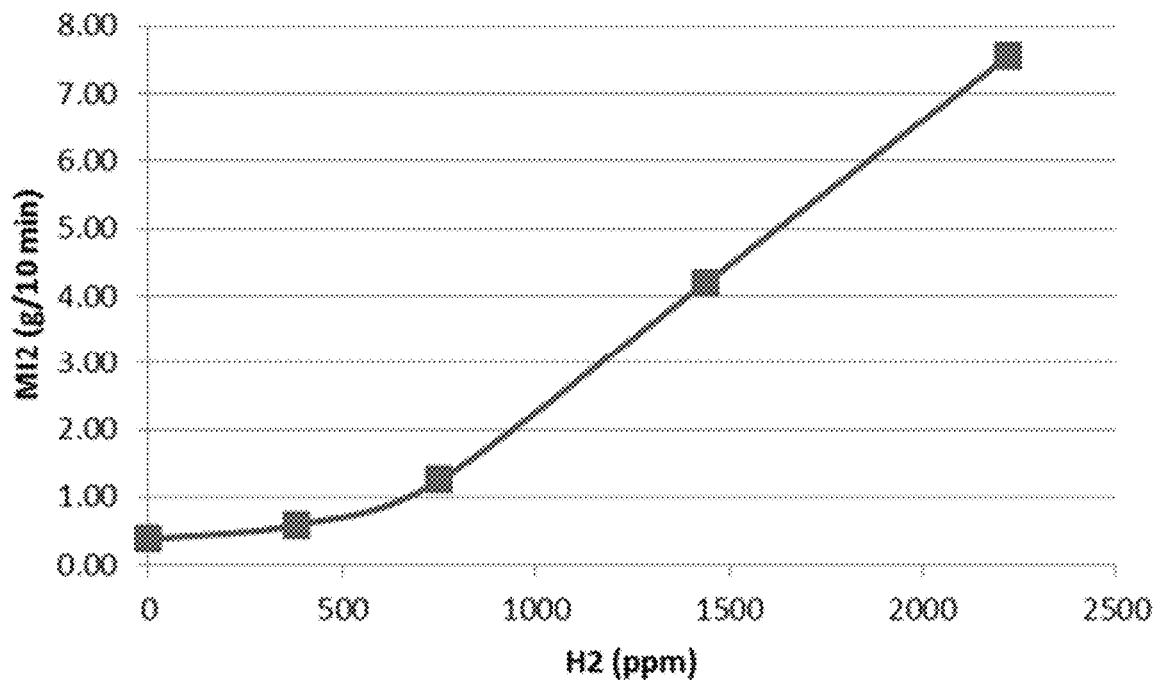
FIG. 4 represents a graph plotting the melt index as a function of hydrogen concentration for polymers produced using catalyst composition Met4/Met5.

The melt flow as a function of hydrogen concentration was also studied for catalyst composition Met4/Met5 1.5:1 (60/40) ratio. The polymerization conditions were the same as listed in Table 2 except for the hydrogen concentration. The results are shown in FIG. 4.

Figure 2:
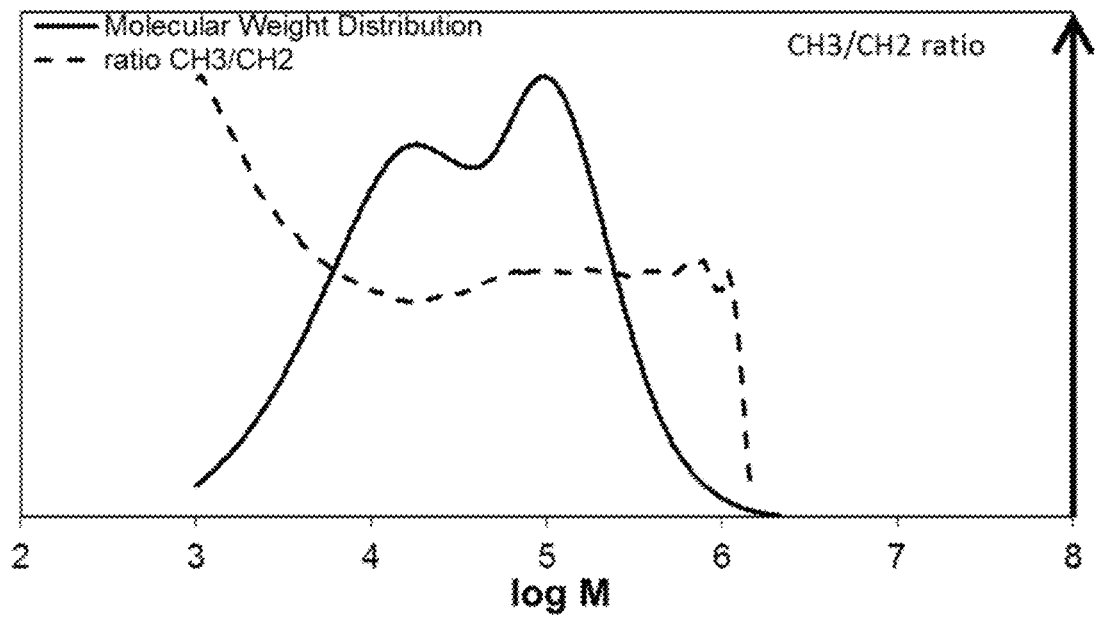
FIG. 2 represents a graph plotting the molecular weight distribution (logarithm of molecular weight) and the ratio $CH_3/CH_2$ of a polymer obtained using a catalyst composition Met1/Met5.
Figure 5:
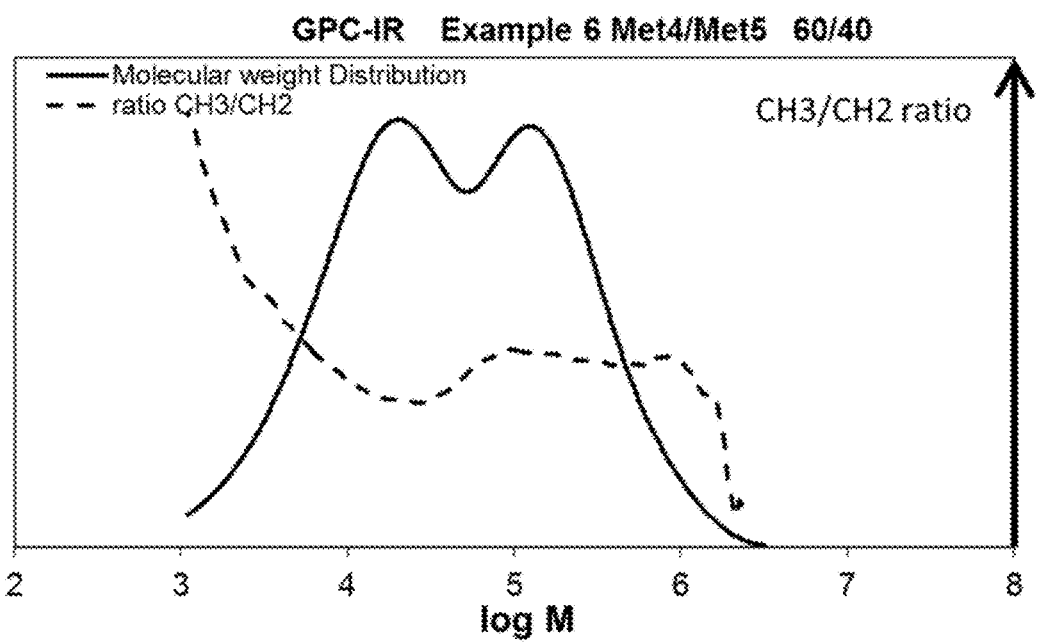
FIG. 5 represents a graph plotting the molecular weight distribution (logarithm of molecular weight) and the ratio $CH_3/CH_2$ of a polymer obtained using catalyst composition Met4/Met5 via example 6 polymerization.
Figure 6:
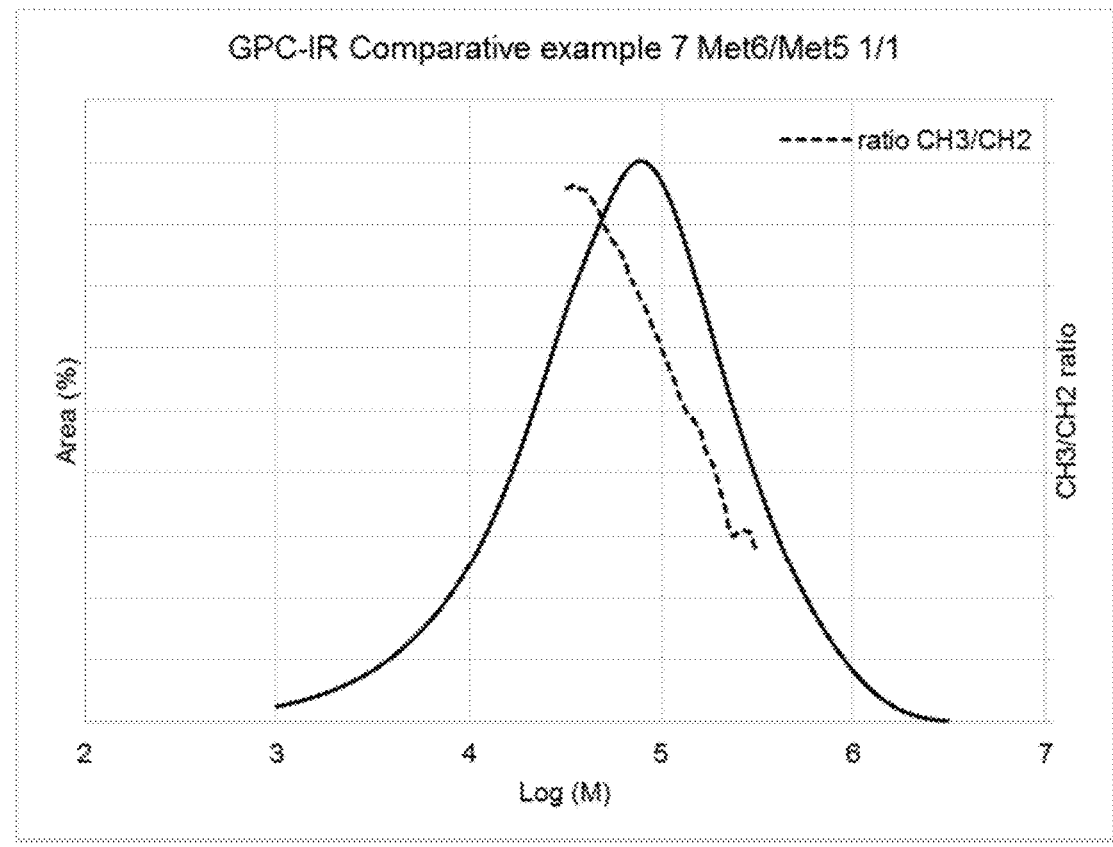
FIG. 6 represents a graph plotting the molecular weight distribution (logarithm of molecular weight) and the ratio $CH_3/CH_2$ of a polymer obtained using catalyst composition Met6/Met5 via comparative example 7 polymerization.
Figure 7:
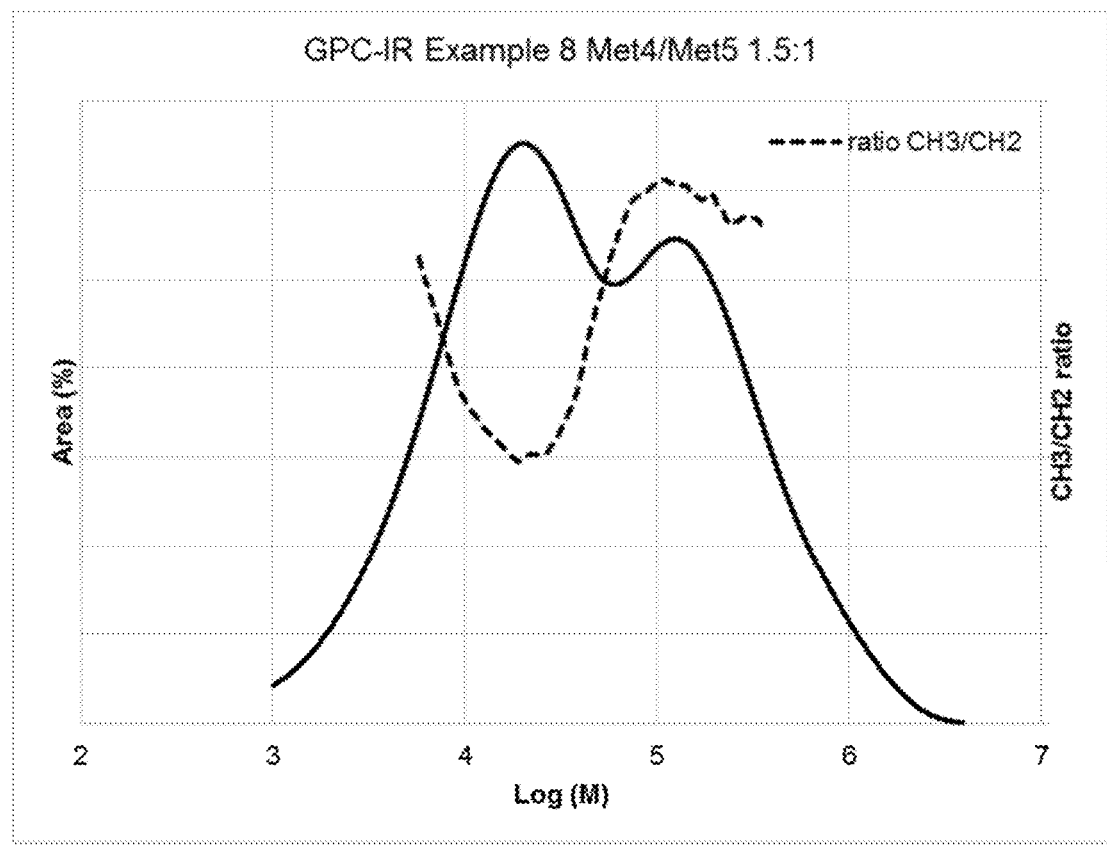
FIG. 7 represents a graph plotting the molecular weight distribution (logarithm of molecular weight) and the ratio $CH_3/CH_2$ of a polymer obtained using catalyst composition Met4/Met5 via example 8 polymerization.

Several families of supported dual catalyst were synthesized and compared with the corresponding single-site catalysts. Polymerizations results revealed a broadening of polymer molecular weight distribution for the catalyst compositions according to the invention and an increase of activity for most of them. Moreover, the "inverse comonomer" incorporation, which would improve polymer mechanical properties, was observed for two combinations: Met1/Met5 and Met4/Met5 (Examples 5, 6 and 8) (see GPC-IR FIGS. 2, 5 and 7, polymerization conditions same as listed in Tables 4 and 5), in contrast with comparative example 7 using combination Met6/Met5 (FIG. 6).

The invention claimed is:

1. A catalyst composition comprising:
   catalyst component A comprising a bridged metallocene compound with two indenyl groups each indenyl being independently substituted with one or more substituents, wherein at least one of the substituent is an aryl or heteroaryl;
   catalyst component B comprising a bridged metallocene compound with a substituted or unsubstituted cyclopentadienyl group and a substituted or unsubstituted fluorenyl group;
   an optional activator; an optional support; and an optional co-catalyst, wherein the bridged metallocene compound of catalyst component B comprises at least one alkenyl, cycloalkenyl, or cycloalkenylalkyl substituent.

2. The catalyst composition according to claim 1, wherein the bridged metallocene compound of catalyst component B comprises at least one alkenyl, cycloalkenyl, or cycloalkenylalkyl substituent on the bridge.

3. The catalyst composition according to claim 1, wherein catalyst component B contains a C, Si, Ge, or B bridging atom.

4. The catalyst composition according to claim 1, wherein the activator comprises an aluminoxane compound, an organoboron or organoborate compound, an ionizing ionic compound, or any combination thereof.

5. The catalyst composition according to claim 1, wherein the catalyst composition comprises a co-catalyst.

6. The catalyst composition according to claim 1, wherein the catalyst composition comprises an organoaluminum co-catalyst selected from the group comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and any combination thereof.

7. The catalyst composition according to claim 1, wherein the support comprises a solid oxide, wherein the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof.

8. The catalyst composition according to claim 1, comprising an alumoxane activator; and a titanated silica or silica solid support; and an optional co-catalyst.

9. The catalyst composition according to claim 1, wherein catalyst component A comprises a bridged metallocene compound of formula (I), wherein

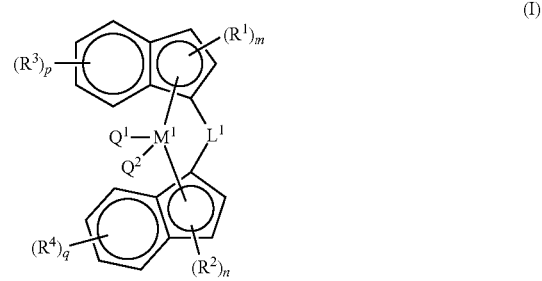

(I)

each of $R^1$ and $R^3$ is independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, heteroalkyl; wherein at least one of $R^1$ or $R^3$ is aryl, wherein each $R^{10}$ is independently hydrogen, alkyl, or alkenyl; and m, n, p, q is each independently an integer selected from 0, 1, 2, 3, or 4;

each of $R^2$ and $R^4$ is are independently selected from the group consisting of alkyl, alkenyl, cycloalkyl, cycloalkenyl, cycloalkenylalkyl, phenyl, alkoxy, alkylaryl, arylalkyl, halogen, $Si(R^{10})_3$, heteroalkyl; wherein at least one of $R^2$ or $R^4$ is aryl, wherein each $R^{10}$ is independently hydrogen, alkyl, or alkenyl; and m, n, p, q are each independently an integer selected from 0, 1, 2, 3, or 4;

$L^1$ is $-[CR^8R^9]_h-$, $SiR^8R^9$, $GeR^8R^9$, or $BR^8$; wherein h is an integer selected from 1, 2, or 3;

each of $R^8$, and $R^9$ are independently selected from the group comprising hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl;

$M^1$ is a transition metal selected from the group consisting of zirconium, titanium, hafnium, and vanadium; and $Q^1$ and $Q^2$ are each independently selected from the group consisting of halogen, alkyl, $-N(R^{11})_2$, alkoxy, cycloalkoxy, aralkoxy, cycloalkyl, aryl, alkylaryl, aralkyl, and heteroalkyl;

wherein $R^{11}$ is hydrogen or alkyl.

10. The catalyst composition according to claim 1, wherein the catalyst component A contains a $SiR^8R^9$, or $-[CR^8R^9]_h-$ bridging group; wherein h is an integer selected from 1, 2, or 3; each of $R^8$, and $R^9$ are independently selected from the group comprising hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl.

11. The catalyst composition according to claim 1, wherein catalyst component B comprises a bridged metallocene compound of formula (II), wherein

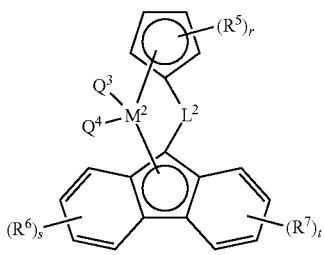

(II)

each of $R^5$, $R^6$, and $R^7$ is independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, heteroalkyl; wherein each $R^{10}$ is independently hydrogen, alkyl, or alkenyl; and r, s, t are each independently an integer selected from 0, 1, 2, 3, or 4;

$L^2$ is $-[CR^8R^9]_h-$, $SiR^8R^9$, $GeR^8R^9$, or $BR^8$; wherein h is an integer selected from 1, 2, or 3;

each of $R^8$ and $R^9$ is independently selected from the group comprising hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl;

$M^2$ is a transition metal selected from the group consisting of zirconium, titanium, hafnium, and vanadium; and $Q^3$ and $Q^4$ are each independently selected from the group consisting of halogen, alkyl, $-N(R^{11})_2$, alkoxy, cycloalkoxy, aralkoxy, cycloalkyl, aryl, alkylaryl, aralkyl, and heteroalkyl;

wherein $R^{11}$ is hydrogen or alkyl.

12. An olefin polymerization process, the process comprising: contacting a catalyst composition according to claim 1, with an olefin monomer, optionally hydrogen, and optionally one or more olefin co-monomers; and polymerizing the monomer, and the optionally one or more olefin co-monomers, in the presence of the at least one catalyst composition, and optional hydrogen, thereby obtaining a polyolefin.

13. An olefin polymer at least partially catalyzed by at least one catalyst composition according to claim 1.

14. An article comprising the olefin polymer according to claim 13.

* * * * *